(12) United States Patent
Gómez Gutiérrez et al.

(10) Patent No.: US 11,551,058 B2
(45) Date of Patent: Jan. 10, 2023

(54) WIRELESS FEEDBACK CONTROL LOOPS WITH NEURAL NETWORKS TO PREDICT TARGET SYSTEM STATES

(71) Applicant: Intel Corporation, Santa Clara, CA (US)

(72) Inventors: David Gómez Gutiérrez, Tlaquepaque (MX); Linda Patricia Osuna Ibarra, Zapopan (MX); Dave Cavalcanti, Portland, OR (US); Leobardo Campos Macías, Guadalajara (MX); Rodrigo Aldana López, Zapopan (MX); Humberto Caballero Barragan, Zapopan (MX); David Arditti Ilitzky, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 600 days.

(21) Appl. No.: 16/455,457

(22) Filed: Jun. 27, 2019

(65) Prior Publication Data
US 2019/0332918 A1  Oct. 31, 2019

(51) Int. Cl.
*G06N 3/04* (2006.01)
*H04L 1/00* (2006.01)

(52) U.S. Cl.
CPC ......... *G06N 3/0445* (2013.01); *G06N 3/0454* (2013.01); *G06N 3/0472* (2013.01); *H04L 1/0081* (2013.01)

(58) Field of Classification Search
CPC .............................. G06N 20/20; G06N 3/0454
See application file for complete search history.

(56) References Cited

U.S. PATENT DOCUMENTS 6,243,610 B1  6/2001 Iino et al.
11,129,117 B2  9/2021 Ibarra et al.
(Continued)

FOREIGN PATENT DOCUMENTS

FR  2861191  4/2005

OTHER PUBLICATIONS

Ławryńczuk M. (2009) Neural Networks in Model Predictive Control. In: Nguyen N.T., Szczerbicki E. (eds) Intelligent Systems for Knowledge Management. Studies in Computational Intelligence, vol. 252. Springer, Berlin, Heidelberg. (Year: 2009).*

(Continued)

*Primary Examiner* — Eric Nilsson
*Assistant Examiner* — Johnathan R Germick
(74) *Attorney, Agent, or Firm* — Hanley, Flight & Zimmerman, LLC

(57) ABSTRACT

Example wireless feedback control systems disclosed herein include a receiver to receive a first measurement of a target system via a first wireless link. Disclosed example systems also include a neural network to predict a value of a state of the target system at a future time relative to a prior time associated with the first measurement, the neural network to predict the value of the state of the target system based on the first measurement and a prior sequence of values of a control signal previously generated to control the target system during a time interval between the prior time and the future time, and the neural network to output the predicted value of the state of the target system to a controller. Disclosed example systems further include a transmitter to transmit a new value of the control signal to the target system via a second wireless link.

24 Claims, 17 Drawing Sheets

(56) References Cited

U.S. PATENT DOCUMENTS

| | | |
|---|---|---|
| 2002/0116154 A1 | 8/2002 | Nowak et al. |
| 2014/0112164 A1 | 4/2014 | Wigren |
| 2014/0201259 A1 | 7/2014 | Bai et al. |
| 2014/0249653 A1* | 9/2014 | Blevins ............... G05B 13/048 700/21 |
| 2015/0304193 A1 | 10/2015 | Ishii et al. |
| 2019/0279100 A1* | 9/2019 | Cline ..................... G06N 5/04 |
| 2019/0394735 A1 | 12/2019 | Osuna Ibarra et al. |

OTHER PUBLICATIONS

Jin-Quan Huang and F. L. Lewis, "Neural-network predictive control for nonlinear dynamic systems with time-delay," in IEEE Transactions on Neural Networks, vol. 14, No. 2, pp. 377-389, Mar. 2003, doi: 10.1109/TNN.2003.809424. (Year: 2003).*

Y. Jin and C. Su, "Adaptive Model Predictive Control Using Diagonal Recurrent Neural Network," 2008 Fourth International Conference on Natural Computation, 2008, pp. 1-5, doi: 10.1109/ICNC.2008.575. (Year: 2008).*

Jin-Quan Huang and F. L. Lewis, "Neural-network predictive control for nonlinear dynamic systems with time-delay," in IEEE Transactions on Neural Networks, vol. 14, No. 2, pp. 1-13, Mar. 2003, doi: 10.1109/TNN.2003.809424. (Year: 2003).*

D.L. Mills (1985) Network Time Protocol from IETF.org; https://www.ietf.org/rfc/rfc0958.txt (Year: 1985).*

Jing Na, et al. "Adaptive neural network predictive control for nonlinear pure feedback systems with input delay". Journal of Process Control 22. 1(2012): 194-206. (Year: 2012).*

Dierks, Travis et al. "Output Feedback Control of a Quadrotor UAV Using Neural Networks". Trans. Neur. Netw. 21. 1(2010): 50-66. (Year: 2010).*

Cavalcanti et al., "Extending Accurate Time Distribution and Timeliness Capabilities Over the Air to Enable Future Wireless Industrial Automation Systems," Proceedings of the IEEE, pre-publication version accepted Feb. 26, 2019, 21 pages.

Ashraf et al., "Ultra-Reliable and Low-Latency Communication for Wireless Factory Automation: From LTE to 5G," IEEE 21st International Conference on Emerging Technologies and Factory Automation, 2016, 8 pages.

Zheng et al., "Delay Estimation via Sliding Mode for Nonlinear Time-Delay Systems," HAL, Nov. 27, 2017, 9 pages.

"ISA100, Wireless Systems for Automation," ISA, 15 pages, retrieved from https://www.isa.org/isa100/ on Jun. 18, 2019.

Sanz et al., "Predictor-Based Control of a Class of Time-Delay Systems and its Application to Quadrotors," IEEE Transactions on Industrial Electronics, Sep. 2016, 11 pages.

"ISA100.11a," Wikipedia, 2 pages, retrieved from https://en.wikipedia.org/w/index.php?title=ISA100.11a&oldid=883273397, last edited Feb. 14, 2019.

"How HART Works," HART Communication Protocol, 2019, 10 pages, retrieved from https://fieldcommgroup.org/technologies/hart/hart-technology-detail on Jun. 18, 2019.

"WirelessHART," Wikipedia, 2 pages, retrieved from https://en.wikipedia.org/w/index.php?title=WirelessHART&oldid=877576584, last edited Jan. 9, 2019.

"Wireless Industrial Networking Alliance," Wikipedia, 1 page, retrieved from https://en.wikipedia.org/w/index.php?title=Wireless_Industrial_Networking_Alliance&oldid=691194527, last edited Nov. 18, 2015.

"Zigbee," Wikipedia, 12 pages, retrieved from https://en.wikipedia.org/w/index.php?title=Zigbee&oldid=900629663, last edited Jun. 6, 2019.

Peng et al., "Predictor-Based Neural Dynamic Surface Control for Uncertain Nonlinear Systems in Strict-Feedback Form," IEEE Transactions on Neural Networks and Learning Systems, vol. 28, No. 9, Sep. 2017, 12 pages.

Ball Balancing Table, Acrome Robotics, 2 pages, retrieved on Jun. 18, 2019.

European Patent Office, "Extended European Search Report," mailed in connection with European Patent Application No. 20163845.9, dated Sep. 14, 2020, 11 pages.

Choi et al., "Neural Network-based Smith Predictor Design for the Time-delay in a Tele-operated Control System," Artificial Life and Robotics, vol. 14, No. 4, 2009, 6 pages.

European Patent Office "Communication Pursuant to Article 94(3) EPC", mailed in connection with EP Application No. 20163845.9, dated Jan. 18, 2022, 12 pages.

* cited by examiner

WIRELESS FEEDBACK CONTROL LOOPS WITH NEURAL NETWORKS TO PREDICT TARGET SYSTEM STATES

FIELD OF THE DISCLOSURE

This disclosure relates generally to control loops and, more particularly, to wireless feedback control loops with neural networks to predict target system states.

BACKGROUND

Feedback control systems in industrial applications typically include a controller to generate a control signal to be applied to an actuator, which is to adjust an input of a target system, such as a plant, being controlled. The controller generates the control signal based on one or more measured outputs of the plant and reference value(s) that represent the corresponding desired output(s) of the plant. Prior feedback control systems often rely on wired networks to convey the control signal from the controller to the actuator, and to convey the measured output(s) of the plant to the controller.

Figure 1:
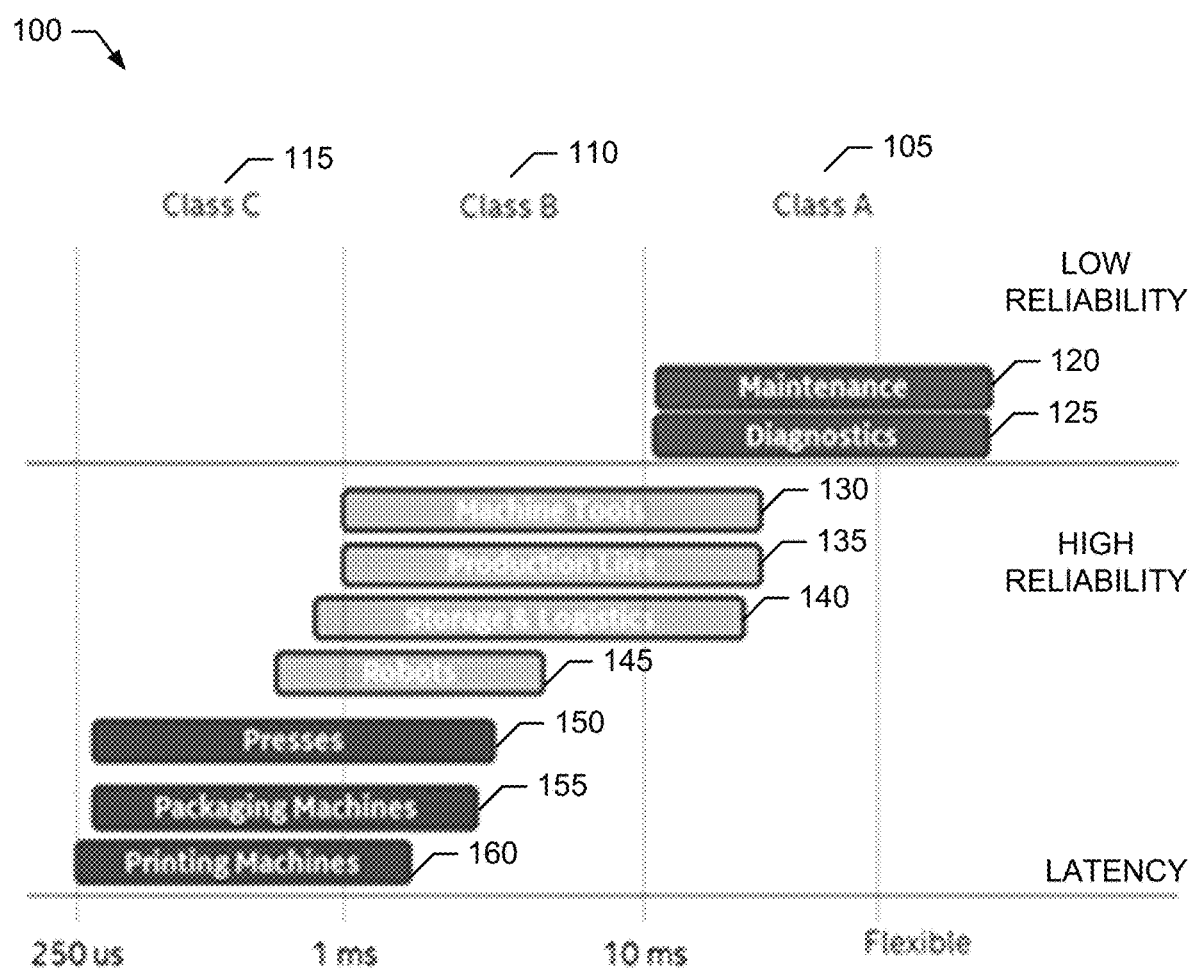
FIG. 1 is a graph illustrating example latency and reliability requirements for different types of industrial systems to be controlled by a feedback control system.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to implement wireless feedback control loops with neural networks to predict target system states are disclosed herein. Example wireless feedback control systems disclosed herein include a receiver to receive a first measurement of a target system via a wireless sensing link (e.g., a first wireless link). Disclosed example systems also include a neural network to predict a value of a state of the target system at a future time relative to a prior time associated with the first measurement. In some disclosed examples, a time interval between the prior time and the future time is based on a first latency of the wireless sensing link and a second latency associated with a wireless actuation link (e.g., a second wireless link). In some disclosed examples, the neural network is to predict the value of the state of the target system based on the first measurement and a prior sequence of values of a control signal previously generated to control the target system during the time interval between the prior time and the future time. In some disclosed examples, the neural network is also to output the predicted value of the state of the target system to a controller that is to generate a new value of the control signal. Disclosed example systems further include a transmitter to transmit the new value of the control signal to the target system via the wireless actuation link.

In some example wireless feedback control systems disclosed herein, the receiver is a first receiver, the transmitter is a first transmitter, and the wireless sensing link and the wireless actuation link are implemented by a wireless time sensitive network. In some disclosed examples, the wireless time sensitive network is to provide time synchronization between the first receiver and a second transmitter that is to transmit the first measurement of the target system to the first receiver via the wireless sensing link. Additionally or alternatively, in some disclosed examples, the wireless time sensitive network is to provide time synchronization between the first transmitter and a second receiver that is to receive the new value of the control signal transmitted by the first transmitter via the wireless actuation link.

In some such disclosed example wireless feedback control systems, the first receiver is to receive the first measurement in a message from the second transmitter via the wireless sensing link. In some such disclosed examples, the message is to include a timestamp to identify a first time at which the second transmitter transmitted the message, and the first receiver is to determine the first latency of the wireless sensing link based on the timestamp and a second time at which the first receiver received the message.

Additionally or alternatively, in some such disclosed example wireless feedback control systems, the first transmitter is to transmit a first one of the prior sequence of values of the control signal in a message to the second receiver via the wireless actuation link. In some such disclosed examples, the message is to include a timestamp to identify a first time at which the first transmitter transmitted the message, and the first transmitter to determine the second latency associated with the wireless actuation link based on a report from the second receiver in response to the message. In some such disclosed examples, the second latency associated with the wireless sensing link corresponds to at least one of a maximum latency of the wireless actuation link, a minimum latency of the wireless actuation link, an average latency for the wireless actuation link, or a probabilistic latency value for the wireless actuation link.

In some example wireless feedback control systems disclosed herein, the time interval between the prior time and the future time is sampled to include a first number of sample times, the predicted value of the state of the target system is a first predicted value, and the neural network includes a first neural network in communication with a second neural network. In some disclosed examples, the first neural network is trained to predict a second predicted value of the state of the target system based on the first measurement and a first one of the prior sequence of values of the control signal corresponding to a first sample time representative of the prior time. In some disclosed examples, the second predicted value of the state of the target system corresponds to one sample time after the first sample time. In some disclosed examples, the second neural network is to predict the first predicted value of the state of the target system based on the second predicted value of the state of the target system and remaining ones of the sequence of values of the control signal corresponding to ones of the first number of samples times after the first sample time.

In some such disclosed example wireless feedback control systems, the second neural network is to predict multiple predicted values of the state of the target system corresponding respectively to respective sample times between the second predicted value and the first predicted value. In some disclosed examples, the second neural network is to predict respective ones of the multiple predicted values iteratively based on application of the remaining ones of the sequence of values of the control signal sequentially to the second neural network.

Some example wireless feedback control systems disclosed herein further include a neural network updater to update the neural network based on an error between the first measurement and a delayed reference value. In some disclosed examples, the delayed reference value is representative of a target state of the target system corresponding to the prior time associated with the first measurement.

These and other example methods, apparatus, systems and articles of manufacture (e.g., physical storage media) to implement wireless feedback control loops with neural networks to predict target system states are disclosed in further detail below.

As mentioned above, prior feedback control systems often rely on wired networks to convey a control signal from a controller to an actuator that is to adjust an input of the system being controlled, such as a plant or, more generally, any controlled system, such as those listed in FIG. 1. Such prior feedback control systems may also rely on wired networks to convey one or more measured outputs of the controlled system back to the controller, which uses the measured output(s) and reference value(s) that represent the corresponding desired output(s) of the plant to generate the control signal to be provided to the actuator. However, it may be desirable to replace the wired network used in prior feedback control systems with one or more wireless networks to, for example, reduce installation cost/complexity, enhance flexibility/mobility of the elements of the feedback control system, etc.

The replacement of wired networks with wireless networks may be relatively straightforward for controlled systems that have slow dynamics and can tolerate a large control time-constant, and/or can have low reliability requirements. However, replacement of wired networks with wireless networks for controlled systems that have fast dynamics and thus require a small control time-constant, and/or have high reliability requirements, is more challenging because, for example, a wireless network can introduce time delays or, in other words, latency in the sensing and/or actuation of the feedback control system. Such time delays (or latencies) can result in performance degradation, or even instability, in the feedback control system.

A graph 100 illustrating example latency and reliability requirements for different types of industrial systems to be controlled by a feedback control system is provided in FIG. 1. The graph 100 of FIG. 1 illustrates three (3) example classes of controlled systems, labelled Class A (also corresponding to reference numeral 105), Class B (also corresponding to reference numeral 110) and Class C (also corresponding to reference numeral 115), with different latency and reliability requirements. Class A represents a first class of controlled systems that have slow dynamics (e.g., high time-constant) and can tolerate low reliability, which include systems such as maintenance systems 120, diagnostic systems 125, etc. Class B represents a second class of controlled systems that have faster dynamics (e.g., lower time-constant) than the Class A systems, and require higher reliability than the Class A systems, which include systems such as machine tools 130, production lines 135, storage and logistics systems 140, industrial robots 145, etc. Class C represents a third class of controlled systems that have high dynamics (e.g., low time-constant) and require high reliability, which include systems such as industrial presses 150, packaging machines 155, printing machines 160, etc.

Prior techniques for migrating feedback control systems, such as those in the areas of industrial automation and manufacturing, focus on the Class A controlled systems described above, which can tolerate high latency (e.g., are characterized by slow dynamics/high time-constant) and low reliability. However, such techniques typically cannot meet the low latency requirements of the Class B and C controlled systems described above, and/or other latency-sensitive and reliability-sensitive controlled systems, such as remote-controlled drones, etc. Prior attempts to migrate feedback control systems for such latency-sensitive and/or reliability-sensitive controlled systems to wireless networks focus on reducing the latency and improving the reliability of the wireless networks, but such attempts may still be insufficient to meet the latency and/or reliability requirements of the Class B and C controlled systems described above, as well as other controlled systems that are latency-sensitive and/or reliability-sensitive.

Unlike such prior feedback control techniques, example predictive feedback control solutions disclosed herein enable use of wireless networks to perform feedback control of the Class B and C controlled systems described above, as well as other controlled systems that are latency-sensitive and/or reliability-sensitive. Such example predictive feedback control solutions disclosed herein can be implemented with any existing or future wireless time sensitive network (WSTN), such as a WSTN conforming to the Institute of Electrical and Electronics Engineers (IEEE) 802.11ax standard, that provides time synchronization between wireless devices communicating in the WSTN. As described in further detail below, such time synchronization can be provided by timestamps included with transmitted messages, a synchronized real time clock (RTC) source provided by the WSTN, etc.

As disclosed in further detail below, some example predictive feedback control solutions implemented in accordance with the teachings of this disclosure include an example state prediction neural network to prevent performance degradation when a wireless network, which typically has larger latency than a wired network, is used instead of, or is used to replace, a wired network in the feedback control system. As disclosed in further detail below, the state prediction neural network utilizes information provided by the wireless devices communicating in the WSTN, such as network timing synchronization, timestamping services, a known maximum latency of the WTSN (e.g., at least known with a target level of reliability), etc., to process the reported output measurements of the controlled system, which may exhibit delay/latency due to the wireless network, to predict a future state of the controlled system, which can be applied to the controller that is to generate the control signal for use by the actuator that is to adjust operation of the controlled system. In some such examples, the state prediction neural network enables use of the same (or similar) controller that would be used with a wired network implementation.

Figure 2:
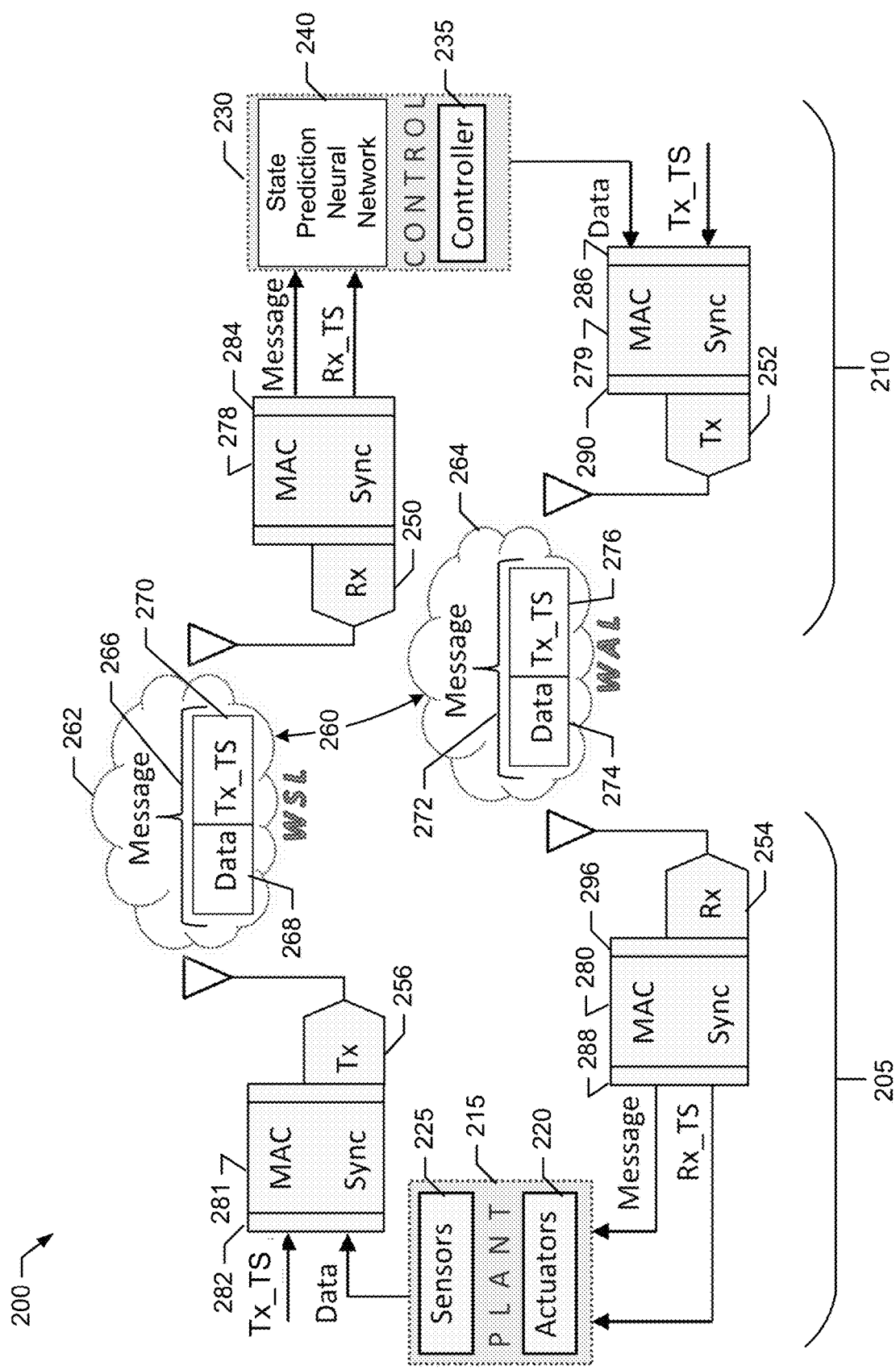
FIG. 2 is a block diagram of an example predictive wireless feedback control system including an example state prediction neural network, both of which are implemented in accordance with teachings of this disclosure.

A block diagram of an example predictive wireless feedback control system 200 implemented in accordance with teachings of this disclosure is illustrated in FIG. 2. The wireless feedback control system 200 of the illustrated example is divided into an example target side 205 and an example control side 210. The target side 205 of the predictive wireless feedback control system 200 includes an example target system 215 to be controlled, which is also referred to herein as an example controlled system 215 or an example plant 215. The target system 215 (or controlled system 215 or plant 215) can correspond to any type(s) and/or number(s) of systems capable of being controlled by a feedback control system. For example, the target system 215 (or controlled system 215 or plant 215) can correspond to one of more of the example systems illustrated in FIG. 2, machinery operating in a factory (e.g., a conveyor belt, drill, press, robot, oven, assembly line, etc.), one or more remote controlled drones, an autonomous vehicle (e.g., a self-driving car), one or more navigation/driving systems of a vehicle (e.g., autonomous parking system, a cruise control system, a lane control system, etc.), etc.

The target system 215 of the illustrated example also includes an example actuator 220 and one or more example sensors 225. The actuator 220 of the illustrated example can correspond to any type(s) and/or number(s) of actuators capable of adjusting one or more inputs of the target system 215. For example, the actuator 220 can include one or more servos, pumps, relays, valves, motors, switches, power supplies, nozzles, injectors, ports, restrictors, etc., to adjust one or more of the inputs of the target system 215. The sensor(s) 225 of the illustrated example can correspond to any type(s) and/or number(s) of sensor(s) capable of measuring one or more outputs of the target system 215. For example, the sensor(s) 225 can include one or more voltage sensors, current sensors, optical sensors, position sensors, pressure sensors, thermal sensors, accelerometers, velocity sensors, etc.

The control side 210 of the predictive wireless feedback control system 200 includes an example predictive feedback control solution 230, which includes an example controller 235, and an example state prediction neural network 240. The controller 235 of the illustrated example can correspond to any type(s) and/or number(s) of controller(s) capable of generating control signal(s) to be provided to the actuator 220. In some examples, the controller 235 is implemented by a logic circuit that performs a conventional proportional control algorithm, a conventional integral control algorithm, a conventional derivative control algorithm, or any combination thereof. In some examples, the controller 235 implements a nonlinear PID control algorithm as disclosed in U.S. patent application Ser. No. 16/455452 (Attorney Docket No. AB5991-US), titled "PREDICTIVE WIRELESS FEEDBACK CONTROL LOOPS," which was filed on the same date as the instant patent application and is incorporated herein by reference.

The state prediction neural network 240 of the illustrated example operates to implement predictive feedback control in accordance with the teachings of this disclosure. In some examples, the state prediction neural network 240 is implemented as a model in software, such as in a distributable binary executable by a computing system, such as the example processor platform 1600 of FIG. 16. In some examples, the state prediction neural network 240 is a neural network model implemented in software as a distributable binary executable by special purpose hardware, such as neuromorphic hardware, one or more artificial intelligence (AI) accelerator chips, one or more Intel® and/or Intel® Movidius™ neural compute sticks, etc., or any combination thereof. Further details concerning the state prediction neural network 240 are provided below. Although the state prediction neural network 240 is depicted as a neural network in the illustrated example, in other examples, other machine learning techniques could be used to perform the functions of the state prediction neural network 240 in the predictive wireless feedback control system 200.

In the illustrated example of FIG. 2, wireless aspects of the predictive wireless feedback control system 200 are implemented by an example control-side receiver 250, an example control-side transmitter 252, an example target-side receiver 254 and an example target-side transmitter 256. The target-side transmitter 256 and the control-side receiver 250 of the illustrated example communicate via an example WTSN 260 to implement an example wireless sensing link (WSL) 262. Likewise, the control-side transmitter 252 and the target-side receiver 254 of the illustrated example communicate via the WTSN 260 to implement an example wireless actuation link (WAL) 264. For example, the WSL 262 can correspond to any protocol defining message formats, message timing, etc., by which the target-side transmitter 256 transmits example sensor messages 266 to the control-side receiver 250. As such, the control-side receiver 250 is an example of means for receiving measurements of the target system 215 via the WSL 262. In the illustrated example, an example sensor message 266 includes an example data payload 268 and an example transmit timestamp 270. The example data payload 268 includes sampled values of measurement(s) taken by the sensor(s) 225, and the transmit timestamp 270 is a timestamp representing the time at which the target-side transmitter 256 transmitted the sensor message 266. Likewise, the WAL 264 can correspond to any protocol defining message formats, message timing, etc., by which the control-side transmitter 252 transmits example actuation messages 272 to the target-side receiver 254. As such, the control-side transmitter 252 is an example of means for transmitting values of a control signal to the target system 215 via the WAL 264. In the illustrated example, an example actuation message 272 includes an example data payload 274 and an example transmit timestamp 276. The example data payload 274 includes sampled values of control signal(s) generated by the controller 235, and the transmit timestamp 276 is a timestamp representing the time at which the control-side transmitter 252 transmitted the actuation message 272.

The WTSN 260 of the illustrated example can correspond to any number(s) and/or types(s) of WSTNs capable of (i) ensuring time synchronization among the control-side receiver 250, the control-side transmitter 252, the target-side receiver 254 and the target-side transmitter 256, and (ii) meeting a target, maximum expected communication latency (e.g., in terms of seconds, milliseconds, microseconds, etc.) with a target level of reliability (e.g., in terms of a percentage, such as 99%, 95% etc.). For example, such time synchronization and maximum expected communication latency requirements can be met by the IEEE 802.1AS synchronization feature enabled by the IEEE 802.11 timing measurement capability of an IEEE 802.11ax network. In such examples, the control-side receiver 250, the control-side transmitter 252, the target-side receiver 254 and the target-side transmitter 256 include respective, example medium access control (MAC) synchronizers 278, 279, 280 and 281 to implement WSTN synchronization, such as the IEEE 802.1AS synchronization feature of an IEEE 802.11ax network As disclosed in further detail below, the example state prediction neural network 240 is trained to use measurement values of the target system 215 received in the sensor messages 266 to predict a future state of the target system 215. For example, the state prediction neural network 240 accounts for the communication latencies exhibited by the wireless feedback control system 200 to predict a future state of the target system 215 that can be applied to the controller 235 to cause the controller 235 to generate an appropriate control signal corresponding to what the state of the target system 215 is expected to be at the time the control signal ultimately reaches the target system 215 (e.g., reaches the actuator 220). In some examples, the communication latencies exhibited by the wireless feedback include a sensing link latency, $\tau_s$, associated with the communication of the sensor messages 266, which carry the measurement values of the target system 215, over the WSL 262 implemented over the WSTN 260. The sensing link latency, $\tau_s$, of the WSL 262, may be random. In some examples, there is also an actuation link latency, $\tau_a$, associated with the communication of the actuation messages 272 over the WAL 264 implemented over the WSTN 260. In such examples, to enable the controller 235 to apply the appropriate correction action, the state prediction neural network 240 accepts as include a received measurement corresponding to a prior time $t-\tau_s$, where $\tau_s$ is the random sensing link latency, and predicts the target system state in the future by a prediction time interval corresponding to $\tau_s+\tau_a$ relative to the time associated with the received measurement, where $\tau_a$ is the actuation link latency. As disclosed in further detail below, the state prediction neural network 240 uses the received measurements of the target system 215 and a history of control signal values sent to the target system 215 (e.g., to the actuator 220), to predict what the actual state of the target system 215 will be at the moment the actuator 220 is to apply an actuation based on the control signal that is currently being generated by the controller 235.

In this way, the state prediction neural network 240 overcomes delays in the messages 266 and 272 being communicated wirelessly in the wireless feedback control system 200. In the illustrated example, the state prediction neural network 240 is located logically between the control-side receiver 250 and the controller 235. In some examples, the state prediction neural network 240 is integrated with the controller 235, for example, as one or more software processes implemented on the same processor (e.g., central processing unit—CPU) implementing the controller 235, as one or more software and/or firmware processes implemented on the same digital signal processor (DSP) implementing the controller 235, as one or more firmware processes implemented by a microcontroller (e.g., microcontroller unit—MCU) implementing the controller 235, etc. In some examples, the state prediction neural network 240 is implemented in a device that is separate from the controller 235. In some examples, the state prediction neural network 240 is implemented as part of the MAC layer in one or more of the wireless transceivers included in the control side of the wireless feedback control system 200. For example, the state prediction neural network 240 could be implemented by the control-side receiver 250, the control-side transmitter 252, the target-side receiver 254 and/or the target-side transmitter 256, such as in one or more of the MAC synchronizers 278, 279, 280 and/or 281 included in the control-side receiver 250, the control-side transmitter 252, the target-side receiver 254 and/or the target-side transmitter 256.

In the illustrated example, the wireless feedback control system 200 determines the wireless communication latencies and, in some examples, determines when to apply control signal values to the actuator 220, based on the timestamps 270 and 276 included in the messages 266 and 272. As such, the target-side transmitter 256 includes an example transmit timestamper 282 to timestamp the sensor messages 266 with the timestamps 270, which indicate the respective times at which the measurements contained in the data payloads 268 of the respective sensor messages 266 were transmitted. The control-side receiver 250 includes an example sensing link latency determiner 284 to determine the sensing link latency, $\tau_s$, of the WSL 262 based on the transmit timestamp 270 included in a given sensor message 266 and a receive time corresponding to a time at which the control-side receiver 250 received that sensor message 266. For example, the sensing link latency determiner 284 may determine the sensing link latency, $\tau_s$, of the WSL 262 as the difference between the receive time at which the control-side receiver 250 received that sensor message 266 and the transmit timestamp 270 included in the sensor message 266. As disclosed above and in further detail below, the state prediction neural network 240 uses the calculated sensing link latency, $\tau_s$, to predict a future state of the target system 215 relative to a prior time (e.g., $t-\tau_s$) associated with the measurement included in a given sensor message 266 being processed.

Similarly, in some examples, the client-side transmitter 252 includes an example transmit timestamper 286 to timestamp the actuation messages 272 with the timestamps 276, which indicate the respective times at which the control signal values contained in the data payloads 274 of the respective actuation messages 272 were transmitted. The target-side receiver 254 includes an example actuation link latency determiner 288 to determine the actuation link latency, $\tau_a$, of the WAL 264 based on the transmit timestamp 276 included in a given actuation message 272 and a receive time corresponding to a time at which the target-side receiver 254 received that actuation message 272. For example, the actuation link latency determiner 288 may determine the actuation link latency, $\tau_a$, of the WAL 264 as the difference between the receive time at which the target-side receiver 254 received that actuation message 272 and the transmit timestamp 276 included in the actuation message 272. In the illustrated, the target-side receiver 254 includes an example actuation link latency reporter 296 to report the calculated actuation link latency, $\tau_a$, to the control side 210 of the predictive wireless feedback control system 200 via a return path (e.g., channel, link, etc.) of the WAL 264. In the illustrated example, the control-side transmitter 252 includes an example actuation link delay selector 290 to receive the actuation link latency, $\tau_a$, reported by the actuation link latency reporter 296 via the WAL 264. In the illustrated example, the actuation link latency reporter 296 provides the actuation link latency, $\tau_a$, to the state prediction neural network 240. As disclosed above and in further detail below, the state prediction neural network 240 uses the calculated actuation link latency, $\tau_a$, to predict a future state of the target system 215 that is ahead of the prior time (e.g., $t-\tau_s$) associated with the measurement being processed by a prediction time interval corresponding to $\tau_s+\tau_a$. In some examples, the actuator 220 also uses the calculated actuation link latency, $\tau_a$, to determine when to use the control signal value received in the given actuation message 272 to adjust the input(s) to the target system 215.

In examples in which the target-side transmitter 256 does not include the transmit timestamper 282, and/or the control-side transmitter 252 does not include transmit timestamper 286, a synchronized real-time clock (RTC) can be provided to the target side 205 and/or the example control side 210 of the predictive wireless feedback control system 200 to enable determination of the communication link latencies.

It is noted that wireless feedback control loops with neural networks, as disclosed herein, are not limited to the architecture of the example wireless feedback control system 200 of FIG. 2. Rather, in some examples, some or all of the functionality disclosed above as implemented by the example predictive feedback control solution 230, the example controller 235, the example state prediction neural network 240, the example MAC synchronizers 278, 279, 280 and/or 281, the example transmit timestamper 282, the example sensing link latency determiner 284, the example transmit timestamper 286, the example actuation link latency determiner 288, the example actuation link delay selector 290 and/or the example actuation link latency reporter 296 could be redistributed among different elements of the target side 205 and/or the control side 210 of the predictive wireless feedback control system 200. For example, some or all of the functionality disclosed above as implemented by the example predictive feedback control solution 230, the example controller 235, the example state prediction neural network 240, the example MAC synchronizers 278, 279, 280 and/or 281, the example transmit timestamper 282, the example sensing link latency determiner 284, the example transmit timestamper 286, the example actuation link latency determiner 288, the example actuation link delay selector 290 and/or the example actuation link latency reporter 296 could be implemented as part of the target system 215 to be controlled, such as in one or more drivers provided to control the target system 215. By way of example, if the target system 215 includes a motor, some or all of the functionality disclosed above as implemented by the example predictive feedback control solution 230, the example controller 235, the example state prediction neural network 240, the example MAC synchronizers 278, 279, 280 and/or 281, the example transmit timestamper 282, the example sensing link latency determiner 284, the example transmit timestamper 286, the example actuation link latency determiner 288, the example actuation link delay selector 290 and/or the example actuation link latency reporter 296 could be integrated into a driver provided for that motor to prevent, or reduce, performance degradation when using the motor in wireless networks.

Figure 3:
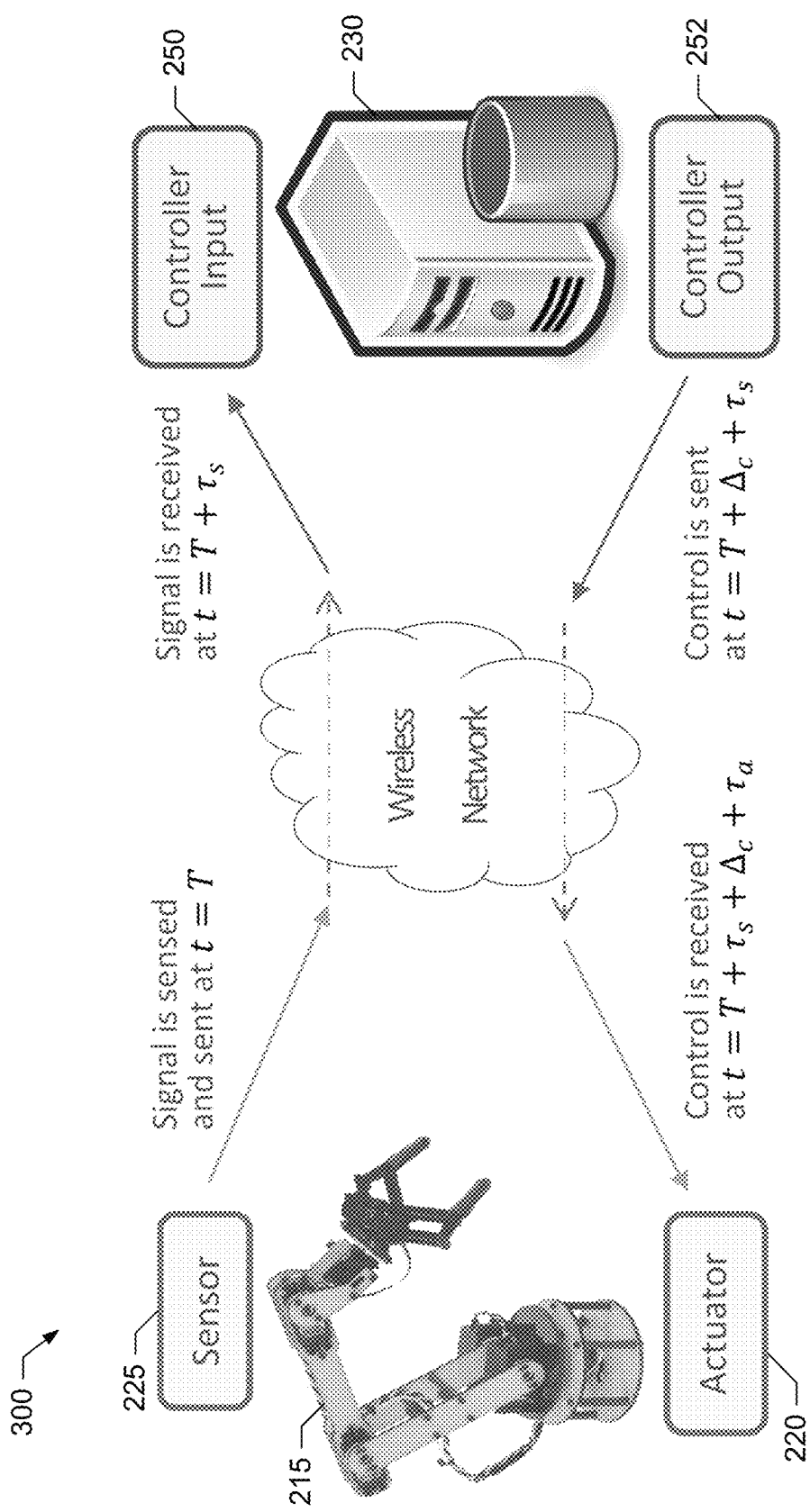
FIG. 3 illustrates example wireless network link latencies in the example predictive wireless feedback control system of FIG. 2

FIG. 3 depicts an example simplified view 300 of the wireless feedback control system 200 to further illustrate the communication link latencies which the state prediction neural network 240 operates to overcome. The simplified view 300 of FIG. 3 includes the target system 215, the actuator 220, the sensor(s) 225, the predictive feedback control solution 230 (which includes the controller 235 and the state prediction neural network 240), the control-side receiver 250, the control-side transmitter 252 and the WTSN 260 (which implements the WSL 262 and the WAL 264). The simplified view 300 illustrates the two primary latencies exhibited by the wireless feedback control system 200. The sensing link latency, $\tau_s$, of the WSL 262 causes measurements of state of the target system 215 received by the control-side receiver 250 to be out-of-date. Thus, prior solution that computes a control signal based on such out-of-date information may not be appropriate when such control is actually applied to the actuator 220. There is also the actuation link latency, $\tau_a$, of the WAL 264, which further delays when a control signal is received by the actuator 220. For example, suppose that the sensing link latency $\tau_s$ and the actuation link latency $\tau_a$ are each equal to 25 ms. In such an example, the total system delay would be 50 ms. This means that for a set of sensed measurements, the corresponding control signal generated from such measurement will arrive at the actuator 220 approximately 50 ms after the measurements were sensed (with a possible additional delay Δc corresponding to the processing time of the predictive feedback control solution 230, which is may be negligible relative to the sensing link latency $\tau_s$ and the actuation link latency $\tau_a$). However, the configuration of the target system 215 may be different from what it was 50 ms ago and, thus, a control signal computed by a prior solution may not work as intended, thereby causing an undesired behavior of the target system 215.

However, unlike prior control system solutions, the wireless feedback control system 200 includes several features to overcome the sensing link latency $\tau_s$ and the actuation link latency $\tau_a$ in the system. For example, to reduce the uncertainty and non-stationarity of the WSL 264 and the WAL 262, improves the accuracy for the neural network 240, the WTSN 260 (e.g. based on the IEEE 802.11ax protocol) is used as the wireless transport. To improve robustness to the sensing link latency, $\tau_s$, of the WSL 262, time-stamping is added to the sensor messages 266 to indicate how outdated each received measurement is. To improve robustness to the actuation link latency, $\tau_a$, of the WAL 264, the state prediction neural network 240 (implemented with, for example, a recurrent neural network (RNN), e.g. an long short-term memory (LSTM) neural network, etc.), is trained to input a sensed measurement that is delayed by the WSL 262 (e.g., with the delay known from the time-stamping), and predict what the state of the target system 215 will be at the moment when the control signal is transmitted via the WAL 264 and applied to the actuator 220. In some examples, only partial information of the state of the target system 215 is measurable. In some such examples, the state prediction neural network 240 is also structured to predict the unmeasured complete state of the target system 215, which is used to drive prediction of the future state of the target system 215.

The controller 235 uses this predicted future value of the state of the target system 215 to calculate the correct control signal to be applied at this future time. The control signal is transmitted by the control-side transmitter 252 via the WAL 264 to the actuator 220. When this control signal is applied by the actuator 220, the state of the target system 215 will coincide with (e.g., match or be similar to) the future state predicted by the state prediction neural network 240 and, thus, the wireless control loop is expected to perform similarly to a wired control loop.

As disclosed in further detail below, the state prediction neural network 240 is trained offline based on information extracted from a wired control system using, for example, a back propagation procedure based on a prediction error. In some examples, the state prediction neural network 240 is further refined using reinforcement learning based on the control performance (e.g., tracking error) measured while the wireless feedback control system 200 is online. In some examples, the state prediction neural network 240 may provide a measure of the uncertainty of the predicted future state of the target system 215. For example, uncertainty may increase for state predictions further into the future, uncertainty may increase when Signal-to-noise-ratio (SNR) decreases, etc. To provide this uncertainty, one disclosed example approach uses Bayesian neural networks to implement the state prediction neural network 240 such that the weights of the neurons of the neural network are distributions instead of deterministic values. Another disclosed example approach involves training the state prediction neural network 240 to output the mean and covariance (and/or other statistical characteristic(s)) of the predicted future state of the target system 215. In some examples, the uncertainty information output from the state prediction neural network 240 is provided to the controller 235 to tune the control signal accordingly. For example, as uncertainty increases, the aggressiveness of the controller 235 may be reduced to maintain a smooth trajectory of the target system 215.

In some disclosed examples, the predictive feedback control solution 230 of the wireless feedback control system 200 is structured to compute control signals for multiple, possible time moments. For example, such possible time moments can be based on the average actuation link latency, $\tau_a$, of the WAL 264, the maximum actuation link latency, $\tau_a$, of the WAL 262. In some examples, decision logic in the actuator 220 selects the control signal to apply in accordance of the observed actuation link latency, $\tau_a$. In some such examples, at each sense-actuation cycle, the estimated probability distribution of actuation link latency, $\tau_a$, of the WAL 262 delay updated.

Figure 4:
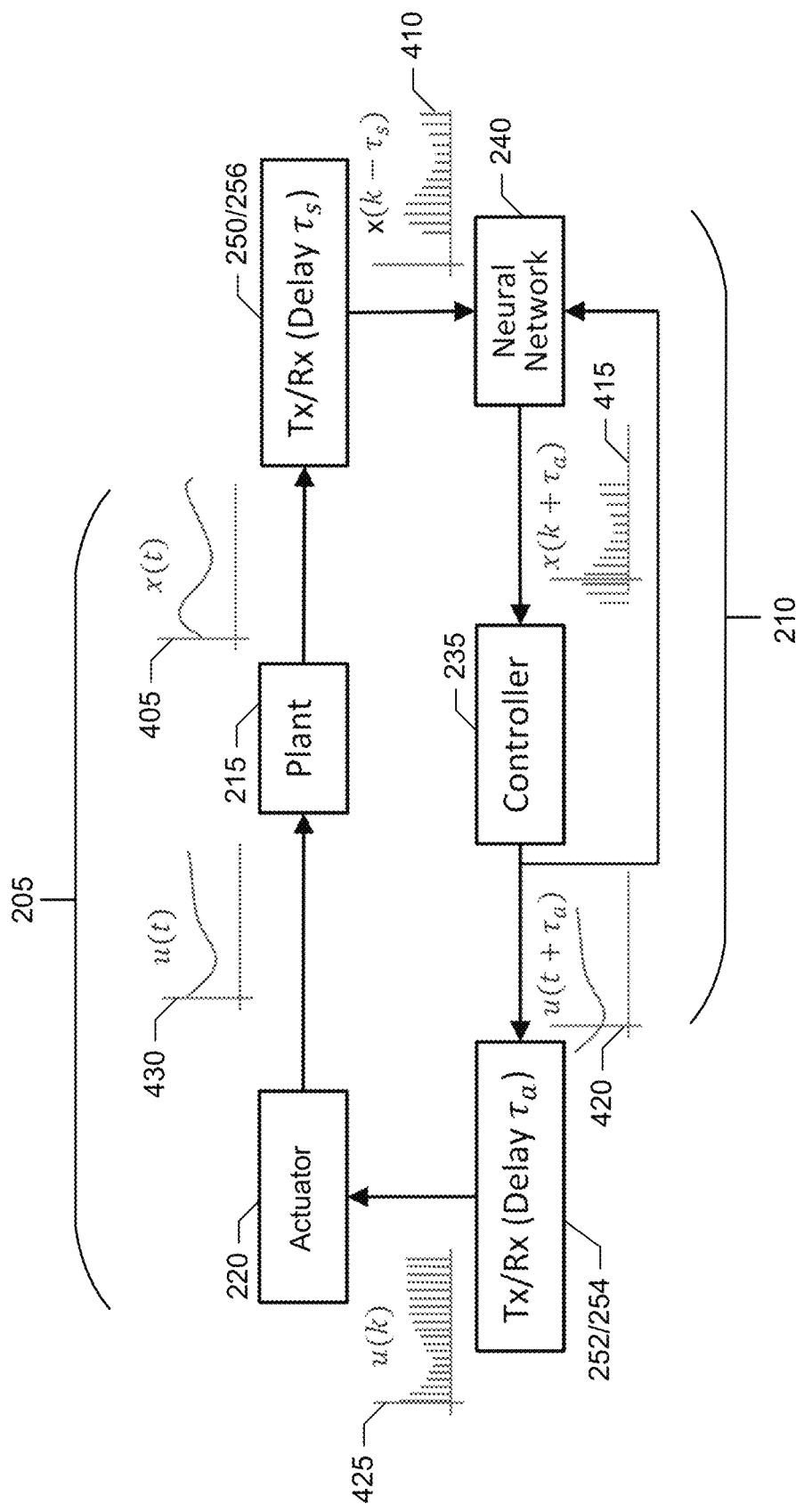
FIG. 4 illustrates an example operation of the example predictive wireless feedback control system of FIG. 2.

An example operation 400 of the predictive wireless feedback control system 200 of FIG. 2 is illustrated in FIG. 4. In the illustrated example operation 400 of FIG. 4, example measurements 405 of the output of the target system 215 are sensed (e.g., by the sensor(s) 225). The measurements 405 are represented by the signal x(t) in FIG. 4. The target-side transmitter 256 samples (digitizes) the measurements 405, encapsulates the sampled measurements 405 in the data payloads 268 of the sensor messages 266 along with the transmit timestamps 270, and transmits the messages 266 via the WSL 262 to the control-side receiver 250. The delivery of the sensor messages 266 over the WSL 262 exhibits a random delay $\tau_s$ (which may be caused by one or more factors, such as packet-errors over the wireless channel, non-deterministic access to the wireless channel, etc.).

When a sensor message 266 is received at the control side by the control-side receiver 250, the sensing link latency determiner 284 determines the sensing link latency, $\tau_s$, of the WSL 262 as the difference between the receive time at which the control-side receiver 250 received that sensor message 266 and the transmit timestamp 270 included in the sensor message 266. As shown in FIG. 4, the received measurement 410 is delayed relative to its sensed version 405 by the sensing link latency $\tau_s$. The control-side receiver 250 provides the received measurement 310 to the state prediction neural network 240.

In the illustrated example, a random actuation link delay, $\tau_a$, is also exhibited on the WAL 264 for the actuation messages 272 sent by the control-side transmitter 252 to the target-side receiver 254. To compensate for the delays introduced by the WSL 262 and the WAL 264, the, the state prediction neural network 240 is used to forecast, as disclosed in further detail below, the future state 415 of the target system 215 at a prediction time interval $\tau_s+\tau_a$ in the future relative to the prior time associated with the received measurement being processed, which as noted above is delayed in time by the sensing link latency $\tau_s$. As such, the prediction time interval represents a sum of the sensing link latency $\tau_s$ and the actuation link delay, $\tau_a$. However, because the delay, $\tau_a$, associated with delivery of the actuation messages 272 over the WAL 264 is random, the actuation link delay $\tau_a$ to be faced by the control signal currently being generated by the controller 235 is not known in advance. Several examples schemes to characterize the actuation link delay $\tau_a$ are disclosed herein.

In a first example estimation scheme, the actuation link delay $\tau_a$ is set to be the maximum expected latency $\tau_{a,MAX}$ for the WAL 264. In some examples, the maximum expected latency for the WAL 264, $\tau_{a,MAX}$, may be a configuration parameter that is known or determinable based on characteristics of the WTSN 260 over which the WAL 264 is implemented.

In a second example estimation scheme, the actuation link delay $\tau_a$ is considered to be a set of statistical values $\tau_{a,MAX}$, $\tau_{a,MIN}$, $\tau_{a,AVE}$, which represent the maximum expected latency $\tau_{a,MAX}$ for the WAL 264, the minimum expected latency $\tau_{a,MAX}$ for the WAL 264, and the average maximum expected latency $\tau_{a,AVE}$ for the WAL 264, respectively. In some such examples, the set of statistical values for the actuation link latency are calculated and updated continually. Additionally or alternatively, in some examples, other statistical values, such as the modes of the latency distribution, are used to characterize the actuation link delay $\tau_a$.

In a third example estimation scheme, the actuation link delay $\tau_a$ is considered to be a set of probabilistic values $\tau_{a,PROB}$, $\tau_{a,o+}$, $\tau_{a,o-}$. In this example, $\tau_{a,PROB}$ represents the most likely actuation link delay based on a probability distribution modeled from measurements of the actuation link delay, and $\tau_{a,o+}$ and $\tau_{a,o-}$ represent upper and lower bounds based on (e.g., proportional to) the standard deviation of the probability distribution. In some such examples, probability distribution modeled of the actuation link delay is calculated and updated continually.

To enable the control side 210 of the predictive wireless feedback control system 200 to learn the values/statistics of the actuation link latency, $\tau_a$, of the WAL 264, the actuation link latency determiner 288 calculates the differences between the receive time sat which the target-side receiver 254 receives actuation messages 272 and the transmit timestamps 276 included in those actuation message 272. The resulting calculated actuation link latencies, $\tau_a$ are reported by the actuation link latency reporter 296 back to the control side 210 through a return message in the WAL 264 (and/or via reporting message via the WSL 262). In this way, at the control side 210, the measurements of the actuation link latency are available and can be used to track the latency statistics of the WAL 264.

In some examples, a wireless adapter implementing the WSTN 260 can provide early feedback concerning the reliability of the WAL 264 to the control side 210 of the predictive wireless feedback control system 200. For example, this reliability information can be extracted from the WTSN schedule used in the wireless adapter to transmit messages via WAL 264. For example, the WTSN schedule can be analyzed to determine the number of scheduled opportunities (and the time separation between them) for message transmission over the WAL 264. In some examples, these scheduling opportunities are decided by the WTSN network central scheduler, and are known by the WTSN wireless adapters ahead of time. The number of scheduled transmission opportunities available for the WAL 264 is related to the reliability of the WAL 264 (e.g., more transmission opportunities translates to higher reliability, whereas fewer transmission opportunities translates to lower reliability), the set of possible delays suffered in the WAL 264 will correspond to the time offsets for each of the scheduled opportunities in the WTSN schedule.

In the illustrated example, the predicted future state 415 output from the state prediction neural network 240 is fed to the controller 235, which calculates the control signal 420, represented by u(t) in FIG. 4. As shown in FIG. 4, the predicted future state 415 and the corresponding control signal 420 are determined for a future time that corresponds to the prediction time interval $\tau_s+\tau_a$ ahead of the prior, delayed time associated with the measurement being used to update the neural network 240. This is because the controller 235 calculates the control signal u(t) based on the future state 415, which is predicted for a time $\tau_s+\tau_a$ in the future relative to the prior, delayed time associated with the measurement, which is delayed in time by the sensing link latency $\tau_s$. In some examples in which multiple values of the actuation link delay $\tau_a$ are considered, such as the set of statistical values $\tau_{a,MAX}$, $\tau_{a,MIN}$, $\tau_{a,AVE}$, the set of probabilistic values $\tau_{a,PROB}$, $\tau_{a,o+}$, $\tau_{a,o-}$, etc., the state prediction neural network 240 predicts multiple future values of the state of the target system 215, which correspond to the respective different actuation link delay. In such examples, the controller determines multiple control signals corresponding respectively to multiple values representing the actuation link delay. However, in some examples, the actuation link delay selector 290 selects one of the multiple values of the actuation link delay $\tau_a$ as a representative value (e.g., based one applying a recent report of the actuation link delay to a probabilistic model of the actuation link delay), and provided this selected actuation link delay to the neural network 240, which predicts the future state of the target system 215 which corresponds to that selected actuation link delay.

The client-side transmitter 252 samples (digitizes) the control signal (or multiple control signals determined for different values of the actuation link delay $\tau_a$), encapsulates the sampled control signal 425 in the data payloads 274 of the actuation messages 272 along with the transmit timestamps 276, and transmits the actuation messages 272 via the WAL 264 to the target-side receiver 254. The delivery of the actuation messages 272 over the WAL 264 exhibits a random delay $\tau_a$ (which may be caused by one or more factors, such as packet-errors over the wireless channel, non-deterministic access to the wireless channel, etc.) Because the control signal u(t) is calculated for a time $\tau_s+\tau_a$ in the future relative to the delayed measurement value that was used (indirectly) to generate the control signal, and the delayed measurement value was delayed in time by the sensing link latency $\tau_s$, and the actuation messages 272 exhibit a random delay $\tau_a$, the resulting control signal values received at the actuator 220 will be received close to when need to be acted on by the actuator 220.

Once the sampled control signal 425 conveyed by the actuation messages 272 are received by the actuator 220, they are acted on by the actuator 220 based on their timestamps 276. In some examples, by knowing when the control signals were sent and received it is possible to know when they must be applied because the delay to be compensated by the state prediction neural network 240 is known by design. For example, the actuation link latency determiner 288 can determine the random actuation link delay $\tau_a$ based on the difference between the received time the actuation messages 272 and transmit timestamps associated with those actuation messages 272, and then determine the timing offset at which the sampled control signal 425 is to be acted on based on the difference. In examples in which multiple control signals that correspond to different values of the actuation link delay $\tau_a$ are received (e.g., corresponding to the set of statistical values $\tau_{a,MAX}$, $\tau_{a,MIN}$, $\tau_{a,AVE}$, the set of probabilistic values $\tau_{a,PROB}$, $\tau_{a,o+}$, $\tau_{a,o-}$, etc.), the actuation link latency determiner 288 selects the control signal associated with the value of the actuation link delay $\tau_a$ that is closest to the actuation link delay $\tau_a$ as the control signal to be provided to the actuator 220. However, in some examples, instead of, or in addition to, time-stamping the actuation messages 272 with the sending time, the actuation messages 272 may be time-stamped with the time for which the control signal is intended to be applied.

In the illustrated example of FIG. 4, the actuator 220 transforms (e.g. with a zero order hold (ZOH) operation) the sampled control signal 425 to form a continuous time actuation signal 430, which is fed to the target system 215, thereby closing the predictive wireless feedback control loop.

Figure 5:
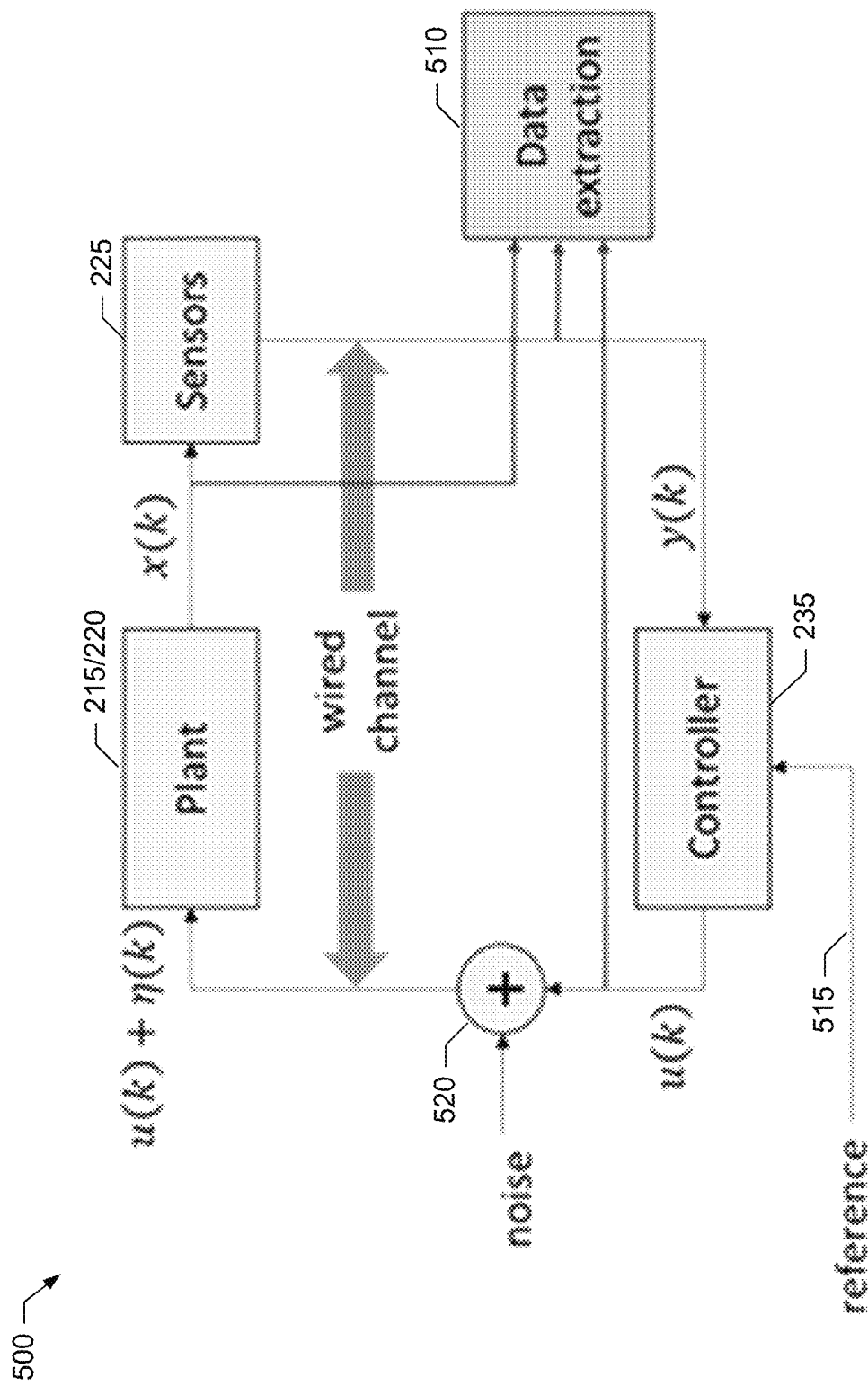
FIG. 5 is a block diagram of an example system to collect training data to be used to train the example state prediction neural network of FIG. 2.

A block diagram of an example data collection system 500 to collect training data to be used to train the example state prediction neural network 240 of FIGS. 2-4 is illustrated in FIG. 5. The data collection system 500 of the illustrated example is a feedback control system that includes the target system 215, the actuator 220, the sensor(s) 225 and the controller 235 of the wireless feedback control system 200 (or suitable equivalents or similar versions of one or more of those elements). However, in contrast with the wireless feedback control system 200, the data collection system 500 includes an example wired network 505 to communicate the measurements sensed by the sensor(s) 225 to the controller 235, and to communicate the control signal generated by the controller 235 to the actuator 220 that controls the input(s) to the target system 215. Thus, the data collection system 500 does not exhibit the communication latencies, such as the sensing link latency $\tau_s$ and the actuation link delay $\tau_a$, exhibited by the wireless feedback control system 200.

The data collection system 500 also includes an example data extraction monitor 510 to monitor the data collection system 500 and extract values of the state of the target system (represented by x(k) in FIG. 5), values of the measurements sensed by the sensor(s) 225 for those values of the target systems states (represented by y(k) in FIG. 5), and corresponding values of the control signal generated by the controller 235 and that resulted in those values of the target systems states (represented by u(k) in FIG. 5). The target state values x(k), the corresponding measurement values y(k) and the corresponding control signal values u(k) collected by the data extraction monitor 510 represent the target (e.g., desired, ideal, etc.) operational performance for controlling the target system 215 to achieve a desired reference state corresponding to a reference signal 515 input to the controller 235. As such, the data collected by the data extraction monitor 510 is stored as the training data to be used to train the state prediction neural network 240. To yield robust training data, in some examples, the data collection system 500 is run multiple times using different reference signals 515 to excite the target system 215.

In some examples, the data collection system 500 also includes an example noise generator 520 to add noise to the control signal values u(k) applied to the actuator 220. In such example, to yield robust training data, the data collection system 500 is run multiple times with the noise generator 520 configured to generate noise at different power levels across at least some of the runs. By performing multiple system runs with different reference signals 515 and/or noise powers generated by the noise generator 520, the collected training data is able to more fully characterize operation of the target system 215, the actuator 220, the sensor(s) 225 and the controller 235 in a wired control system, such as the data collection system 500.

Figure 6:
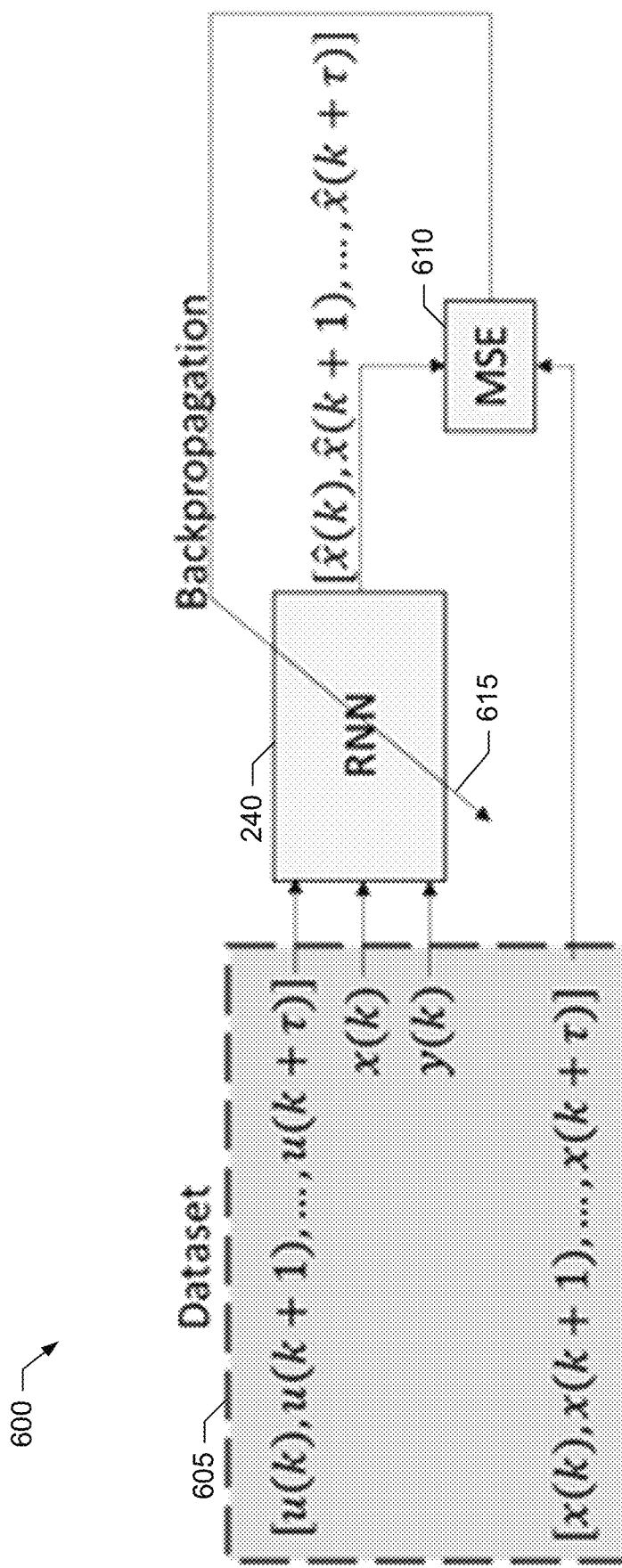
FIG. 6 illustrates an example training procedure that may be used to train the example state prediction neural network of FIG. 2.
Figure 8:
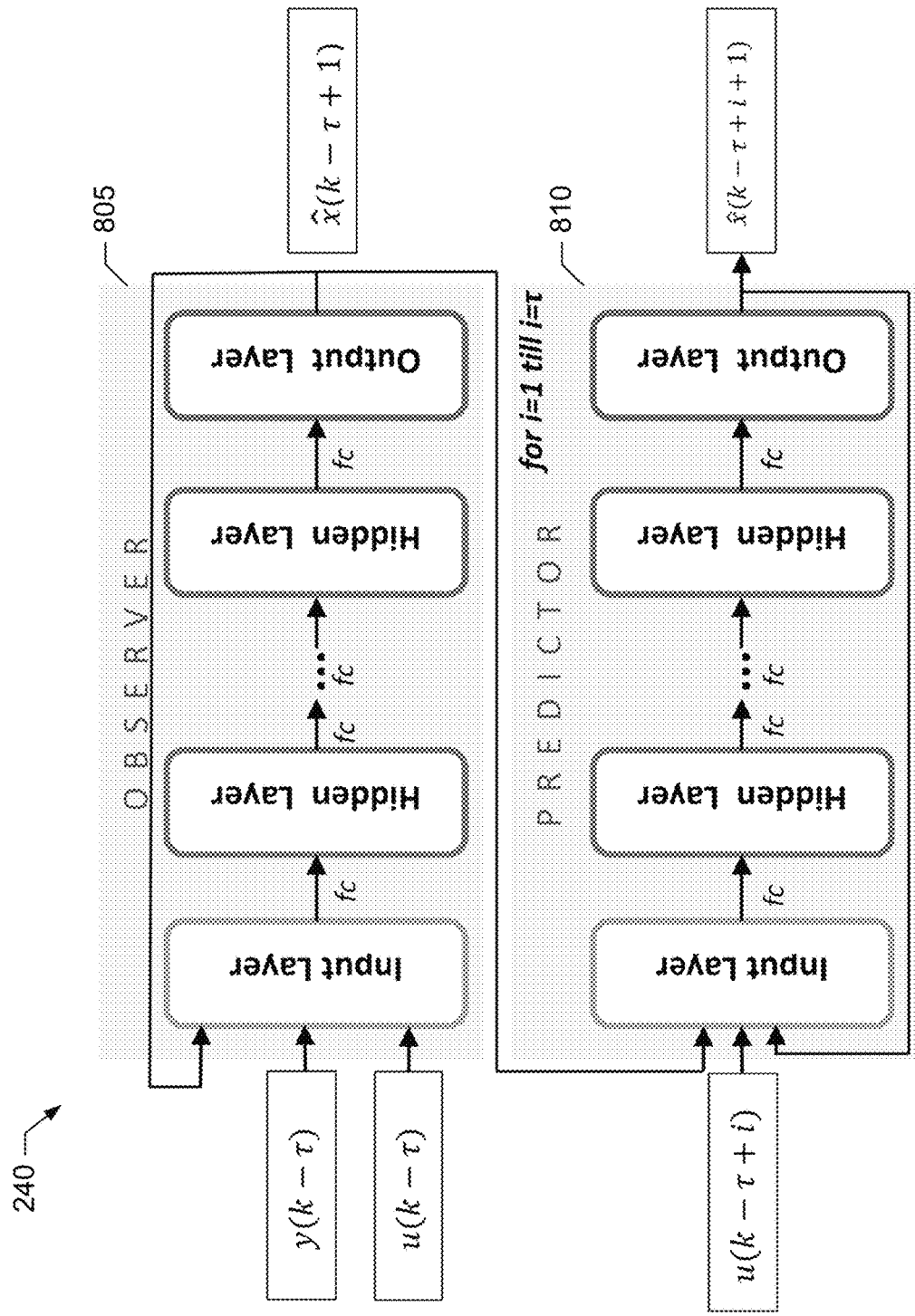

FIG. 6 illustrates an example training procedure 600 that may be used to train the example state prediction neural network 240 of FIGS. 2-4 using the training data collected by the example data collection system of FIG. 5. In some examples, the state prediction neural network 240 is implemented with an RNN, and LSTM, etc. Another example implementation of the state prediction neural network 240 is illustrated in FIG. 8, which is described in further detail below. In the illustrated example of FIG. 6, the state prediction neural network 240 is trained based on the training data to a predict future value of the state of the target system 215 (represented by x̂(k) in FIG. 6) for a future time that is a prediction time interval ahead of a time associated with a current measurement value being processed (represented by y(k) in FIG. 6). As described above, the state prediction neural network 240 predicts the future value of the target system state based on the current measurement value y(k) and the sequence of control signal values (represented by u(k) in FIG. 6) that were generated to control the target system 215 during the prediction time interval between the time associated with the current measurement y(k) and the future time corresponding to the predicted future value of the target system state.

As described above, in some examples, the prediction time interval corresponds to the sum of the sum of the sensing link latency $\tau_s$ and the actuation link delay $\tau_a$, that is, $\tau_s+\tau_a$. The example state prediction neural network 240 of FIGS. 2-4 is structured to operate on discrete time data. Therefore, in the training procedure 600 of FIG. 6, and during operation as described above and in further detail below, the prediction time interval is divided (e.g., sampled) into a number of sample times (represented by $\tau$ in FIG. 6) that corresponds to a data sampling rate employed in the system 200. In other words, in the illustrated examples disclosed herein, $\tau$ represents that number of sample times that corresponds to the prediction time interval (e.g., $\tau_s+\tau_a$).

With the foregoing in mind, the state prediction neural network 240 is trained iteratively for a given prediction time interval $\tau$ according to the example training procedure 600 as follows. At each processing iteration, the state prediction neural network 240 is trained based on next measurement value y(k) taken from the training data. That next measurement value y(k) represents a delayed measurement that would be received by the state prediction neural network 240 in the system 200 with a sensing link latency $\tau_s$. As described above, the future state of the target system 215 predicted by the state prediction neural network 240 corresponds to a future time that is the prediction time interval ahead of the timer associated with the measurement, which corresponds to $\tau$ time samples ahead of the measurement value y(k). In other words, a goal of the training procedure 600 is to train the state prediction neural network 240 to predict the future value x̂(k+$\tau$) of the target system state relative to the input measurement y(k).

Accordingly, at each processing iteration, an example training data set 605 is constructed from the training data collected by the data collection system 500 as follows. The training data set 605 for the given processing iteration is constructed to include, from the collected training data, the next measurement value y(k) to be processed, as well as the sequence of control values [u(k), u(k+1), ..., u(k+$\tau$)], which represent the sequence of control signal values that were generated to control the target system 215 during the prediction time interval from the time associated with the measurement (k) to the future time (k+$\tau$) for which the state of the target system 215 is to be predicted. The next measurement value y(k) and the sequence of control values [u(k), u(k+1), ..., u(k+$\tau$)] form the training inputs to the neural network 240. The training data set 605 for the given processing iteration is also constructed to include, from the collected training data, the sequence of measured states [x(k), x(k+1), ..., x(k+$\tau$)] of the target system 215. The sequence of measured states [x(k), x(k+1), ..., x(k+$\tau$)] corresponds to the actual target system states resulting from the corresponding sequence of control values [u(k), u(k+1), ..., u(k+$\tau$)]. As described above, the neural network 240 is also designed to predict the complete state of the target system 215 from the measurements. Accordingly, the training data set 605 is also constructed to include, from the training data, the complete state x(k) of the target system 215 corresponding to the next measurement value y(k) to be processed. The target system state value x(k) also forms a training input to the neural network 240.

Once the training data set 605 is formed, the neural network 240 is trained during a given training iteration as follows. The measurement value y(k) to be processed during this training iteration and the corresponding measured state value x(k) from the training data set 605 are input to the neural network 240. Then, each one of the sequence of control values [u(k), u(k+1), ..., u(k+$\tau$)] is applied sequentially to the neural network 240, which predicts a corresponding future value [x̂(k), x̂(k+1), ..., x̂(k+$\tau$)] for each one of the sequence of control values applied sequentially to the neural network 240. For each predicted future state value $\hat{x}(k+i)$, an example error calculator 610 is used to calculate a prediction error, such as a mean squared error (MSE), between the predicted future state value $\hat{x}(k+i)$ and the corresponding measured state value $x(k+i)$ in the training data set 605. In the illustrated example, the resulting prediction error output from the error calculator 610 for a given predicted future state value $\hat{x}(k+i)$ operates as a loss function that is applied to a backpropagation algorithm that updates the neurons of the neural network 240.

At the conclusion of applying the sequence of control values $[u(k), u(k+1), \ldots, u(k+\tau)]$ to the neural network 240, the final predicted future state value $\hat{x}(k+\tau)$ corresponds to the output predicted future state of the target system 215 for the future time that is predicted time interval ahead of the time (k) associated with the measurement value y(k) processed during that iteration. In the illustrated example, the training procedure 600 continues iterating through training sets constructed as described above for the next available measurement value y(k) until the prediction error output from the error calculator 610 satisfies (e.g., is less than, less than or equal to, etc.) a target performance threshold. In some examples, the training procedure 600 is then repeated for different possible values of the prediction time interval $\tau$. For example, for each execution of the training procedure 600, a value of the prediction time interval $\tau$ can be selected (e.g., randomly, sequentially, etc.) from a range of possible prediction time intervals $\tau$ that is determined based on latency characteristics of the WTSN 260 implementing the WSL 262 and the WAL 264. In some such examples, the training procedure 600 is repeated until the neural network 240 is trained for a threshold number of different possible prediction time intervals $\tau$.

Figure 7:
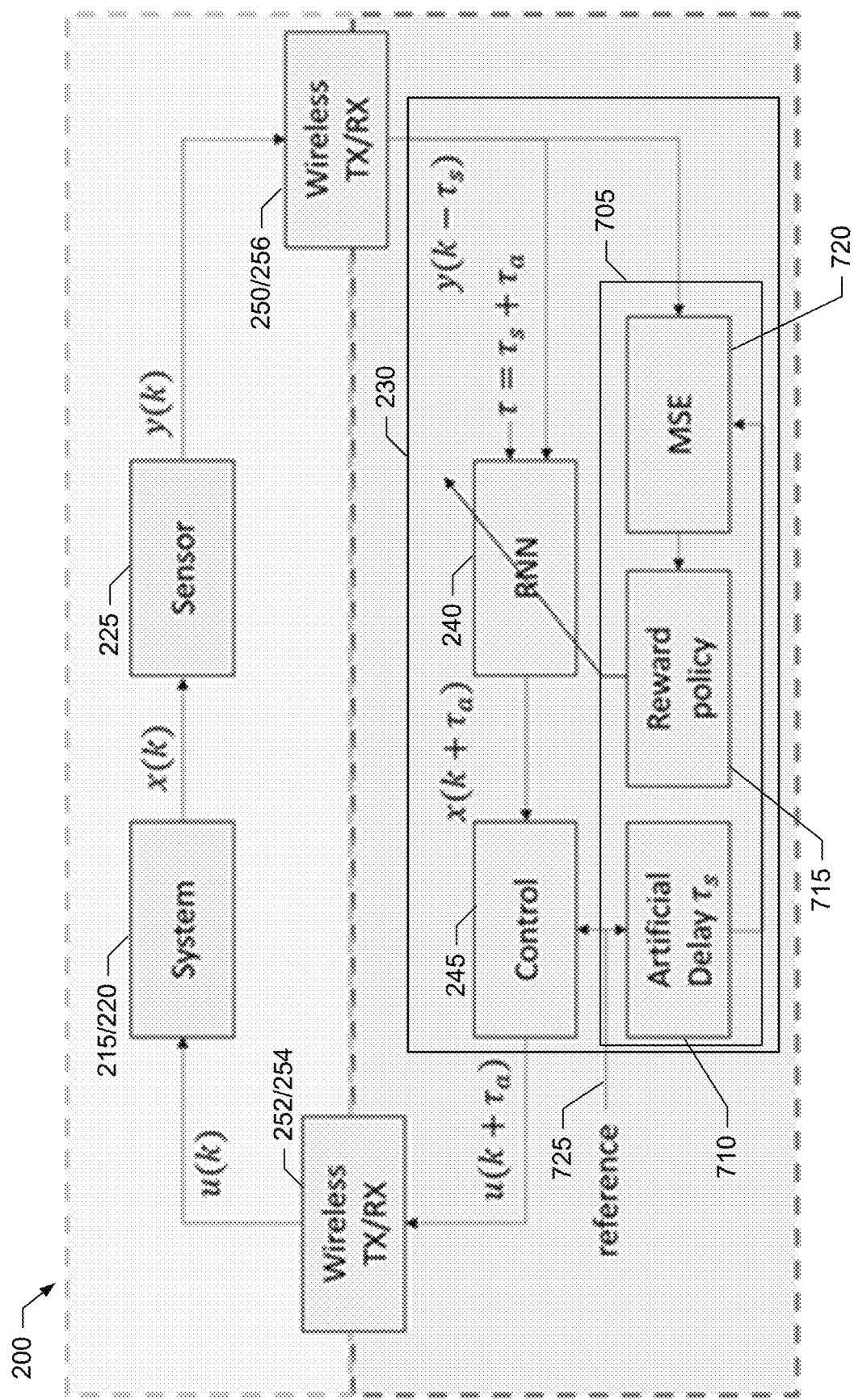
FIGS. 7-8 illustrate example implementations of the state prediction neural network of FIG. 2

An example implementation of the predictive feedback control solution 230 in the wireless feedback control system 200 is illustrated in FIG. 7. In the example of FIG. 7, the wireless feedback control system 200 includes the actuator 220, the example sensor(s) 225, the feedback control solution 230, the example control-side receiver 250, the example control-side transmitter 252, the example target-side receiver 254 and the example target-side transmitter 256, as described above. In the example of FIG. 7, the predictive feedback control solution 230 includes the example controller 235 and the state prediction neural network 240, as described above. However, as shown in the illustrated example, the predictive feedback control solution 230 also includes an example neural network updater 705 update (e.g., refine) the state prediction neural network 240 during operation in the wireless feedback control system 200. As such, the neural network updater 705 is an example of means for updating the neural network 240. However, other examples of means for updating the neural network 240 are disclosed in further detail below.

The neural network updater 705 includes an example time delayer 710, an example reward policy enforcer 715 and an example error calculator 720. The example training procedure 600 of FIG. 6 used a prediction error based on a difference between the predicted future state value $\hat{x}(k+i)$ and the corresponding measured state value $x(k+i)$ in the training data set 605 as the cost function to update the neural network 240. However, in the wireless feedback control system 200, the measured state value $x(k+i)$ is a for a time in the future and, thus, is not known when the neural network 240 predicts the future state value $\hat{x}(k+i)$. Thus, the example neural network updater 705 employs a different cost function to update the neural network 240. In the illustrated example, the neural network updater 705 determines a cost function representative of a tracking performance error, which is fed into any appropriate backpropagation algorithm, such as the backpropagation algorithm 615 of FIG. 6, to refine the neurons of the neural network 240 during operation in the wireless feedback control system 200.

For example, the tracking performance error determined by the neural network updater 705 corresponds to a difference between the current measurement of the state of the target system 215 as reported to the neural network 240 (represented by $y(k-\tau_s)$ in FIG. 7) and a correspondence reference value 725 representative of a desired target state (e.g., a reference state) of the target system 215 at the time corresponding to the current measurement. Because the current measurement of the state of the target system 215, $y(k-\tau_s)$, is delayed by the sensing link latency $\tau_s$, the neural network updater 705 includes the example time delayer 710 to also delay the reference value 725 by the currently measured sensing link latency $\tau_s$ (e.g., by a number of time samples corresponding to the sensing link latency $\tau_s$). The neural network updater 705 includes the error calculator 720, which may implement a similar or different error calculation as the error calculator 610 of FIG. 6, to determine the tracking performance error based on the current measurement of the state of the target system 215, $y(k-\tau_s)$, and the delayed reference value 725 output from the time delayer 710.

In some examples, the neural network updater 705 includes the reward policy enforcer 715 to apply a reward policy to the tracking performance error calculated by the error calculator 720 before the error is used (e.g., by a backpropagation algorithm) to update the neural network 240. Example reward policies that could be applied to the tracking performance error include, but are not limited to, a Monte-Carlo reward policy, and actor-critic reward policy, etc. However, in some examples, the reward policy enforcer 715 is omitted and the tracking performance error calculated by the error calculator 720 is processed by the backpropagation algorithm to update the neural network 240 during operation in the wireless feedback control system 200.

An example implementation of the state prediction neural network 240 of FIGS. 2-4, 6 and/or 7 is illustrated in FIG. 8. The state prediction neural network 240 of FIG. 8 is an example of means for predicting a value of a state of the target system 215 at a future time relative to a prior time associated with a measurement of the target system 215 received via the WSL 262. However, other examples of means for predicting such future values of the states of the target system 215 are disclosed in further detail below. The example neural network 240 of FIG. 8 is an RNN that includes two example neural networks 805 and 810, which are examples of first neural network means and second neural network means, respectively. In the illustrated example, the neural networks 805 and 810 are each fully connected. In the illustrated example, the neural network 805 corresponds to an example observer neural network 805 that is trained (e.g., indirectly) to estimate of a full observed state of the target system 215 from a received measurement of the target system 215. In the illustrated example, the neural network 810 corresponds to an example predictor neural network 810 trained to predict future values of the state of the target system 215 a prediction time interval ahead of the measurements values based on input measurement values and control signal values sent to the target system 215 for actuation during the prediction time interval. Thus, the input data applied to the state prediction neural network 240 of the illustrated example includes the delayed measurements $y(k-\tau)$ reported by the sensor(s) 225 via the WSL 262 to the neural network 240, and the sequence of control signal values (u(k−τ), u(k−τ+1), u(k−τ+2) . . . , u(k)) previously generated by the controller 235 for actuation by the actuator 220 during the prediction time interval or, in other words, the sequence of control signal values (u(k−τ), u(k−τ+1), u(k−τ+2) . . . , u(k)) sent by the controller 235 to the actuator 220 via the WAL 264 for the τ samples times between the prior time associated with the measurement value y(k−τ) being processed and the future time (k) for which the future state value of the targets system 215 is to be predicted.

(As noted above, the prediction time interval is divided (e.g., sampled) into a number of sample times τ that corresponds to a data sampling rate employed in the system 200. In other words, in the illustrated examples disclosed herein, τ represents that number of sample times that corresponds to the prediction time interval, e.g., $\tau_s+\tau_a$. To simplify the notation, in FIG. 8, the variable k represents the sample time corresponding the future time for which the neural network 240 is to predict the future state value of the target system 215 or, in other words, k represents the sample time corresponding to $t+\tau_a$, where t represents the current time. Because τ represents that number of sample times that corresponds to the prediction time interval, e.g., $\tau_s+\tau_a$, in FIG. 8, the variable k−τ represents the sample time corresponding to the prior time of the measurement value y being processed, or in other words, k−τ represents the sample time corresponding to $t-\tau_s$, where t represents the current time.)

In the illustrated example of FIG. 8, the observer neural network 805 accepts as input the received, delayed measurement value y(k−τ) and the first control signal value u(k−τ) in the sequence of control signal values, which corresponds to the control signal value that was previously generated by the controller 235 for application to the actuator 220 at the time of the received, delayed measurement value y(k−τ). In the example of FIG. 8, the observer neural network 805 was trained (e.g., based on the example procedure 600 of FIG. 6) to predict, from those inputs, the value of the state (e.g., the full observable state, also referred to as an extended state, which may include the measurement value as well as other unmeasured outputs) of the target system 215 one sample time after the sample time associated with the delayed measurement value y(k−τ) and the first control signal value u(k−τ), that is, the observer neural network 805 predicts x(k−τ+1).

In the illustrated example of FIG. 8, the state prediction x(k−τ+1) output from the observer neural network 805 is fed as input to the predictor neural network 810. The predictor neural network 810 also accepts as input the remaining control signal values in the sequence of control signal values, that is, remaining ones of the sequence of control signal values (u(k−τ+1), u(k−τ+2) . . . , u(k)) described above. In the illustrated example, the predictor neural network 810 performs a sequence of processing iterations to process each of the remaining ones of the sequence of control signal values sequentially to predict a corresponding future value of the state of the target system 215 that is one sample time ahead of the sample time of control signal value applied to the predictor neural network 810 during that processing iteration. For example, the input to the predictor neural network 810 performs τ processing iterations, i=1, . . . , τ, where τ corresponds to the number of sample times in the prediction time interval. At the $i^{th}$ processing iteration, the predictor neural network 810 uses the control signal value u(k−τ+i) determined by the controller 235 for actuation at that sample time to predict the value of the state of the target system 215 advanced one sample time ahead of the sample time of the control signal value, that is, x̂(k−τ+i+1). This predicted state value is fed back to the predictor neural network 810 as shown in FIG. 8, and at the next processing iteration, the next control signal value in the sequence is processed. Once the number of iterations, τ, corresponding to the number of sample times in the prediction time interval is completed, the resulting output of the predictor neural network 810 is the predicted future value of the state of the target system 215 that is advanced in time by the prediction time interval relative to the time of the received measurement initially processed by the neural network 240. Thus, in the illustrated example, the predictor neural network 810 operates at a faster rate than the observer neural network 805 because the predictor neural network 810 performs τ processing iterations for each processing iteration performed by the observer neural network 805.

As described above, the predicted future state values output from the neural network 240 is input to the controller 235 to generate the control signal. Because the controller 235 uses the predicted future state values from the neural network 240, the controller 235 generates its control signal for a state of the target system 215 that has not happened yet, but is expected happen by the time the control signal arrives to the target system 215 wirelessly via the WAL 264.

In some examples, the neural network 240 may also provide a measure of the uncertainty in the predictions of the future state values of the target system 215. For example, predictions further in time may have greater uncertainty. Additionally or alternatively, the uncertainty may increase as SNR decreases. An example approaches to include such uncertainty is to implement the neural network 805 and/or 810 as Bayesian neural networks where instead of deterministic values for the neuron weights, there are distributions of weights for the neurons. Another example approach to include such uncertainty is to train the neural network 805 and/or 810 to output the mean and covariance of their predictions. The uncertainty information can be fed to the controller 235 to tune the control signal accordingly. For example, as uncertainty increases, the controller 235 may lower the aggressiveness of the control signal to maintain a smooth trajectory of the state of the target system 215.

FIGS. 9-12 illustrate example operational results obtained by an example implementation of the neural network 240 in the example wireless feedback control system 200. In the illustrated example of FIGS. 9-12, the target system 215 is a triple integrator with dynamics given by Equation 1, which is:

$$\dot{x}_1 = x_2$$

$$\dot{x}_2 = x_3$$

$$\dot{x}_3 = u \qquad \text{Equation 1}$$

In Equation 8, the state of the target system 215 is presented by $(x_1, x_2, x_3)$, and u represents the control signal. The control signal is generated by the controller 235 according to the proportional control algorithm of Equation 2, which is:

$$u = -Ke + v \qquad \text{Equation 2}$$

In Equation 2, where K is a diagonal matrix with elements $k_{i,i} > 0, i \in \mathbb{Z}[1,3]$, v a function depending on the reference and $e = [x_1 - \text{ref } x_2 - \text{ref } x_3 - \text{r\"ef}]^T$. In the examples of FIGS. 9-12, the reference is ref=A sin(ωt).

Figure 9:
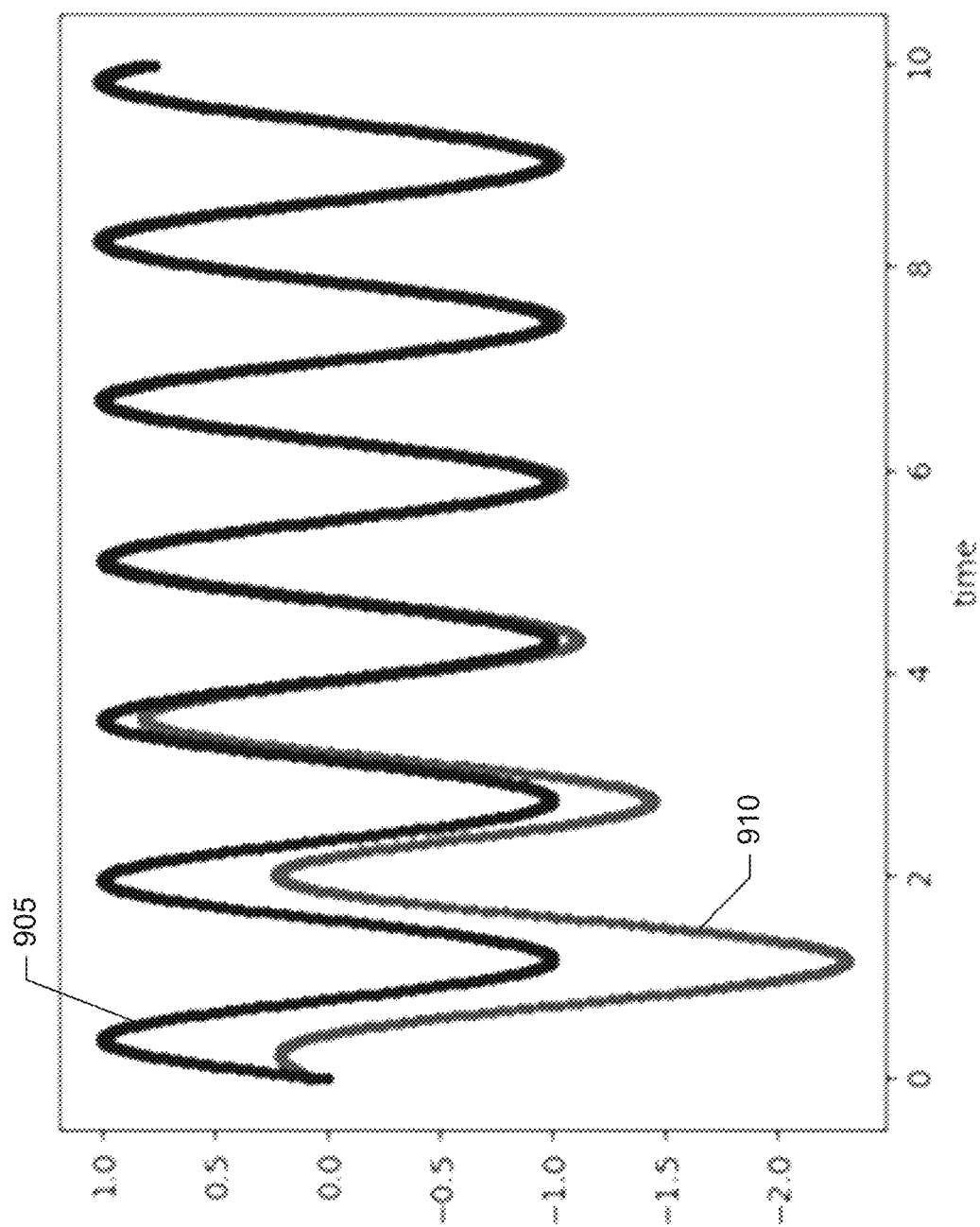
FIGS. 9-12 illustrate example operational results obtained by the example predictive wireless feedback control system of FIG. 2.

The tracking performed by the controller 235 in the absence of communication delays (e.g., when the system is wired) is shown in FIG. 9. The line labeled 905 represents the performance (state) of the target system 215 and the line labeled 910 is the reference to be tracked. In the illustrated example, only output of the target system 215 corresponding to the state $x_1$ is shown.

Figure 10:
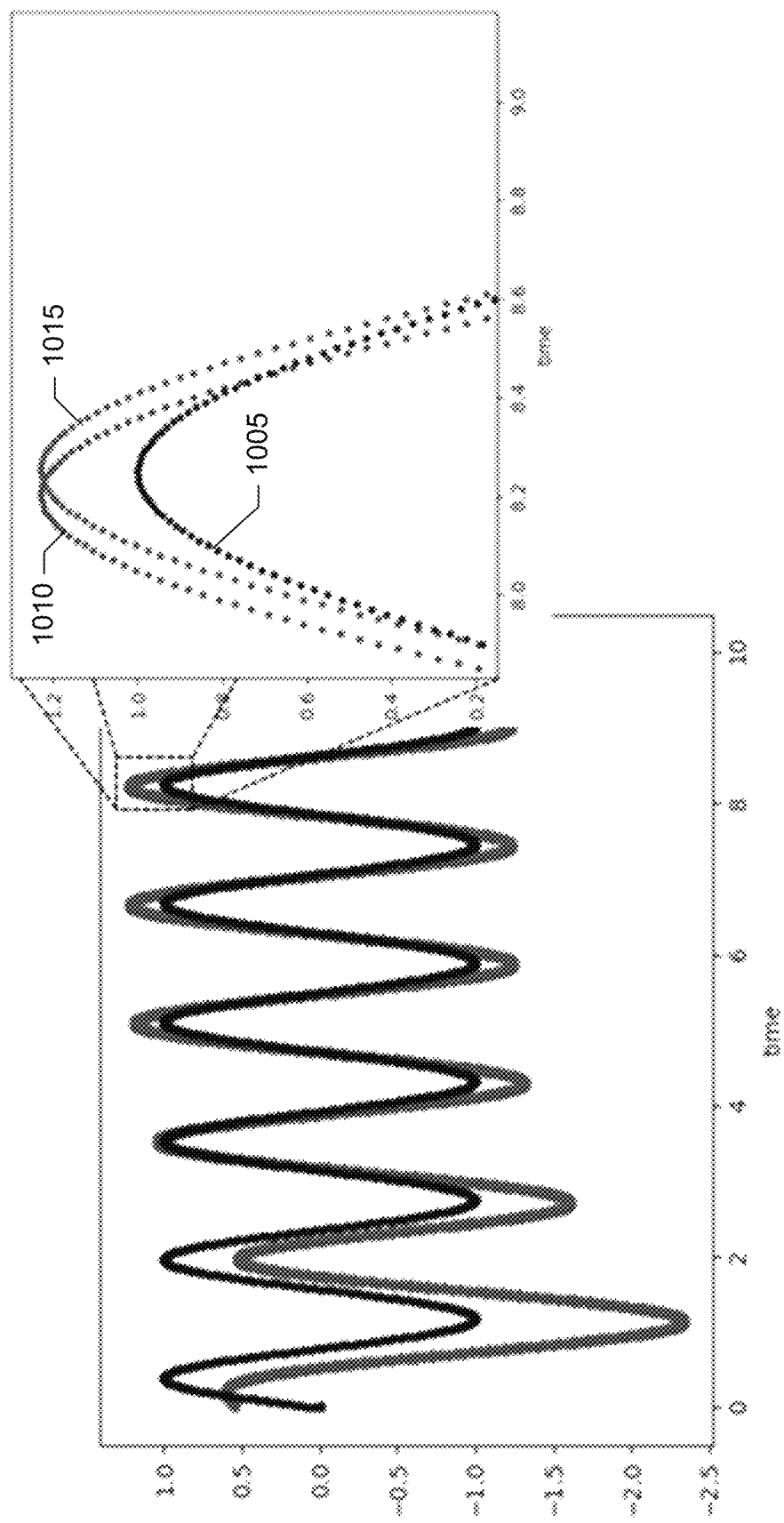

FIG. 10 illustrates operation of the system with a delay of 50 ms without state prediction as disclosed herein. In FIG. 10, the line labeled 1005 is the reference to be tracked, the line labeled 1010 is the performance (state) of the target system 215, and the line labeled 1015 is the state delayed by 50 ms simulating the wireless network latency. In this illustrated example, the state corresponding to the line labeled 1015 is being fed to the controller 235.

Figure 11:
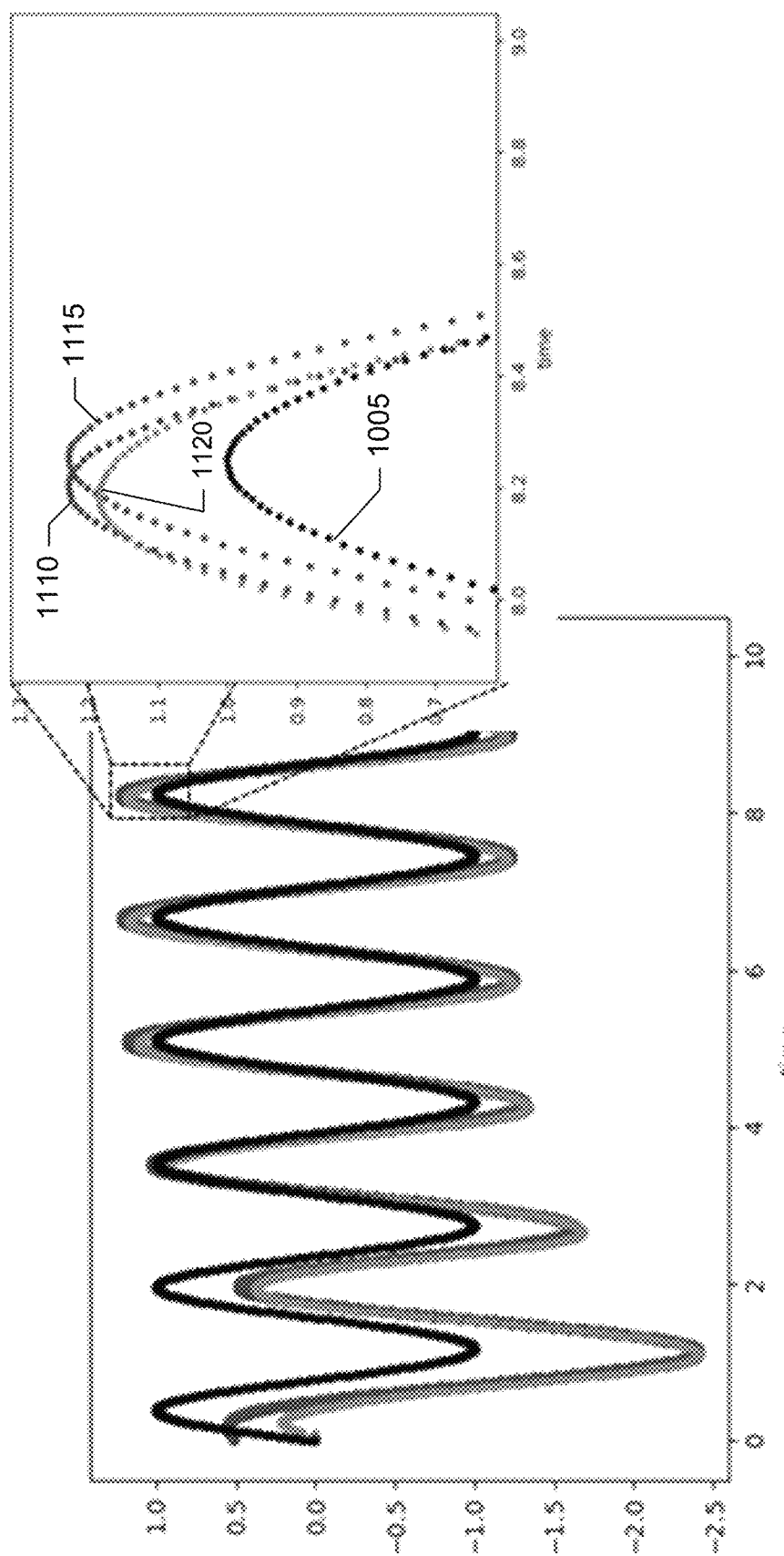

FIG. 11 illustrates operation of the system with a delay of 50 ms with state prediction as disclosed herein. The line labeled 1105 is the reference to be tracked, the line labeled 1110 is the performance (state) of the target system 215, the line labeled 1115 is the target system state with 50 ms delay, which is fed to the controller 235, and the line labeled 1120 is the output of the prediction neural network 240. Thus, FIG. 11 illustrates operation of the prediction neural network 240, but the controller 235 is still operating on the delayed (unpredicted) state of the target system 215. As shown in FIG. 11, the prediction neural network 240 foresees where the target system state will be 50 ms in the future, which is why the line labeled 1120 coincides in time with the line labeled 1010. Note that, in this example, the prediction neural network 240 is fed with the three states $x=[x_1(t-50 \text{ ms}) \; x_2(t-50 \text{ ms}) \; x_3(t-50 \text{ ms})]^T$ and predicts the future for each one. For sake of simplicity, FIG. 11 illustrates just the prediction of $x_1$ which coincidently is the prediction that had the largest error.

Figure 12:
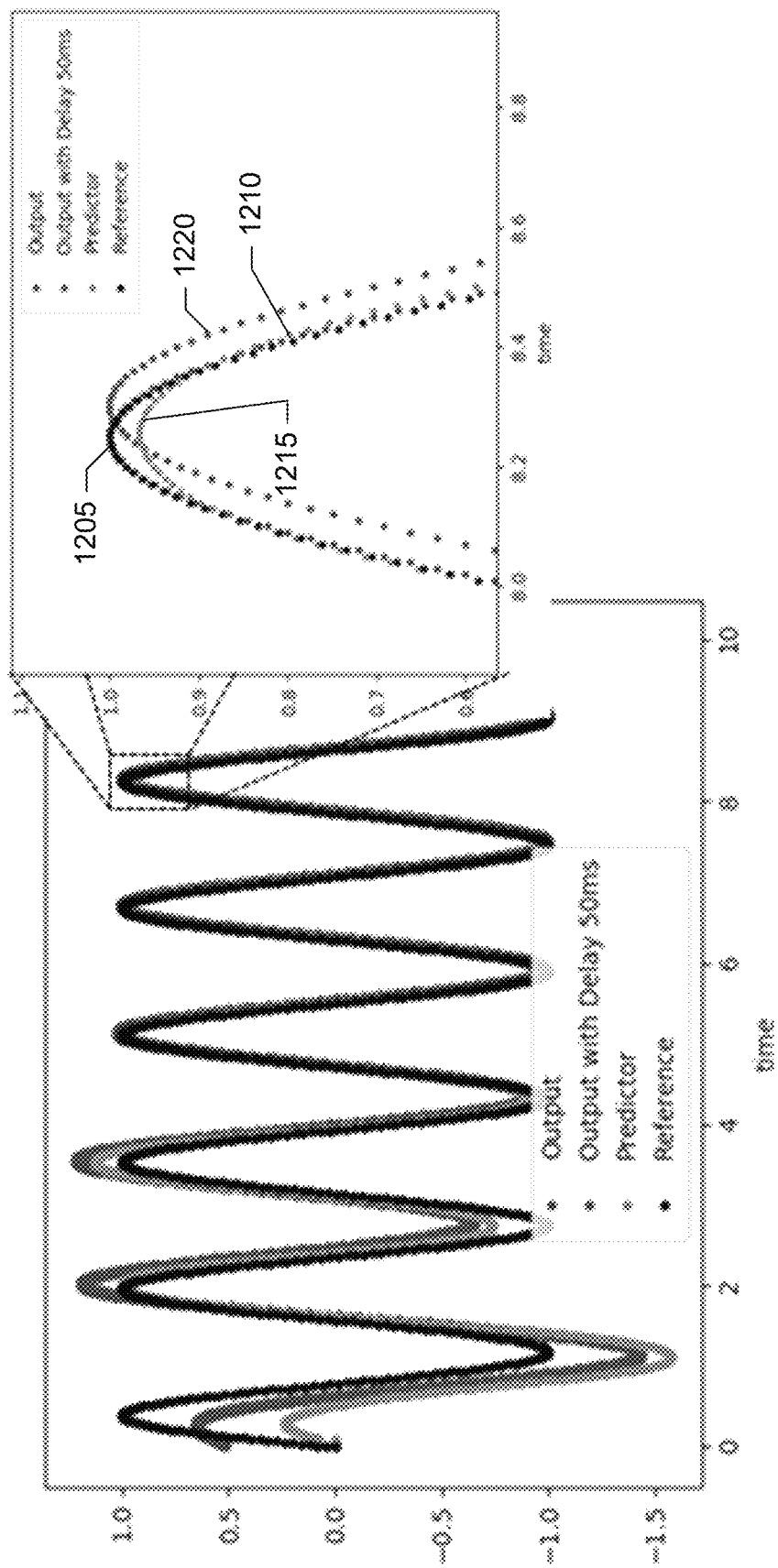

FIG. 12 illustrates operation of the system with a delay of 50 ms with state prediction as disclosed herein. However, in this example, the predicted state that is output from the prediction neural network 240 is fed to the controller 235 instead of the delayed state of the target system 215. As shown in FIG. 12, the performance is improved, with the line labeled 1205 representing the reference, the line labeled 1210 representing the performance (state) of the target system 215, and the line 1215 representing the predicted state that is output from the predictor. (The line labeled 1220 represents the target system state with 50 ms delay, for reference.) Although the transient response is different from the one shown in FIG. 9 (for the wired system), the steady-state responses of FIGS. 9 and 12 are substantially the same.

While example manners of implementing the predictive wireless feedback control system 200 are illustrated in FIGS. 2-8, one or more of the elements, processes and/or devices illustrated in FIG. 2-8 may be combined, divided, re-arranged, omitted, eliminated and/or implemented in any other way. Further, the example actuator 220, the example sensors 225, the example predictive feedback control solution 230, the example controller 235, the example state prediction neural network 240, the example control-side receiver 250, the example control-side transmitter 252, the example target-side receiver 254, the example target-side transmitter 256, the example MAC synchronizers 278, 279, 280 and/or 281, the example transmit timestamper 282, the example sensing link latency determiner 284, the example transmit timestamper 286, the example actuation link latency determiner 288, the example actuation link delay selector 290, the example actuation link latency reporter 296, and/or, more generally, the example predictive wireless feedback control system 200 of FIGS. 2-8 may be implemented by hardware, software, firmware and/or any combination of hardware, software and/or firmware. Thus, for example, any of the example actuator 220, the example sensors 225, the example predictive feedback control solution 230, the example controller 235, the example state prediction neural network 240, the example control-side receiver 250, the example control-side transmitter 252, the example target-side receiver 254, the example target-side transmitter 256, the example MAC synchronizers 278, 279, 280 and/or 281, the example transmit timestamper 282, the example sensing link latency determiner 284, the example transmit timestamper 286, the example actuation link latency determiner 288, the example actuation link delay selector 290, the example actuation link latency reporter 296, and/or, more generally, the example predictive wireless feedback control system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example predictive wireless feedback control system 200, the example actuator 220, the example sensors 225, the example predictive feedback control solution 230, the example controller 235, the example state prediction neural network 240, the example control-side receiver 250, the example control-side transmitter 252, the example target-side receiver 254, the example target-side transmitter 256, the example MAC synchronizers 278, 279, 280 and/or 281, the example transmit timestamper 282, the example sensing link latency determiner 284, the example transmit timestamper 286, the example actuation link latency determiner 288, the example actuation link delay selector 290, and/or the example actuation link latency reporter 296 is/are hereby expressly defined to include a non-transitory computer readable storage device or storage disk such as a memory, a digital versatile disk (DVD), a compact disk (CD), a Blu-ray disk, etc. including the software and/or firmware. Further still, the example predictive wireless feedback control system 200 of FIGS. 2-8 may include one or more elements, processes and/or devices in addition to, or instead of, those illustrated in FIGS. 2-8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13:
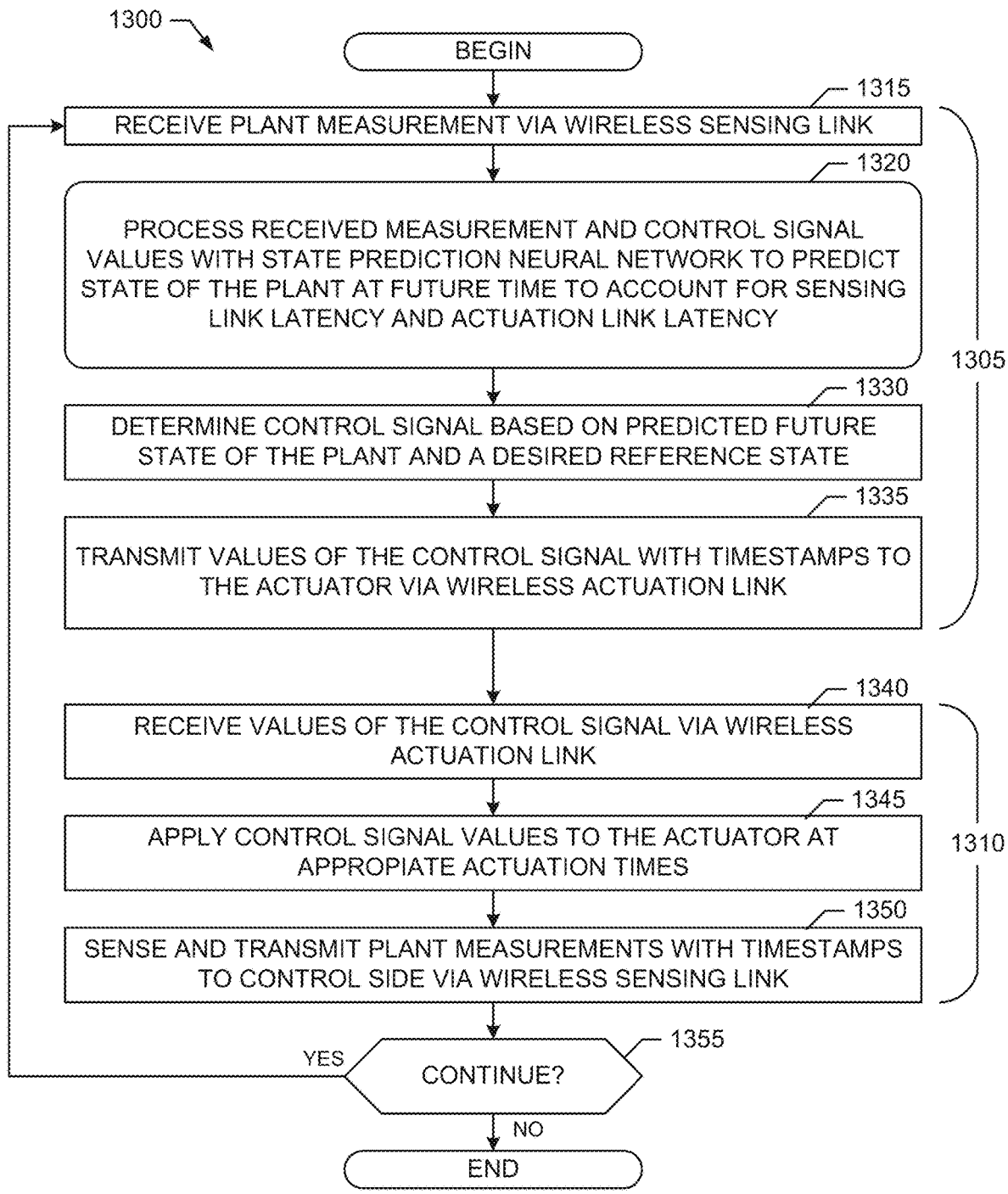
FIG. 13 is a flowchart representative of example computer readable instructions that may be executed to implement the example predictive wireless feedback control system of FIG. 2.
Figure 14:
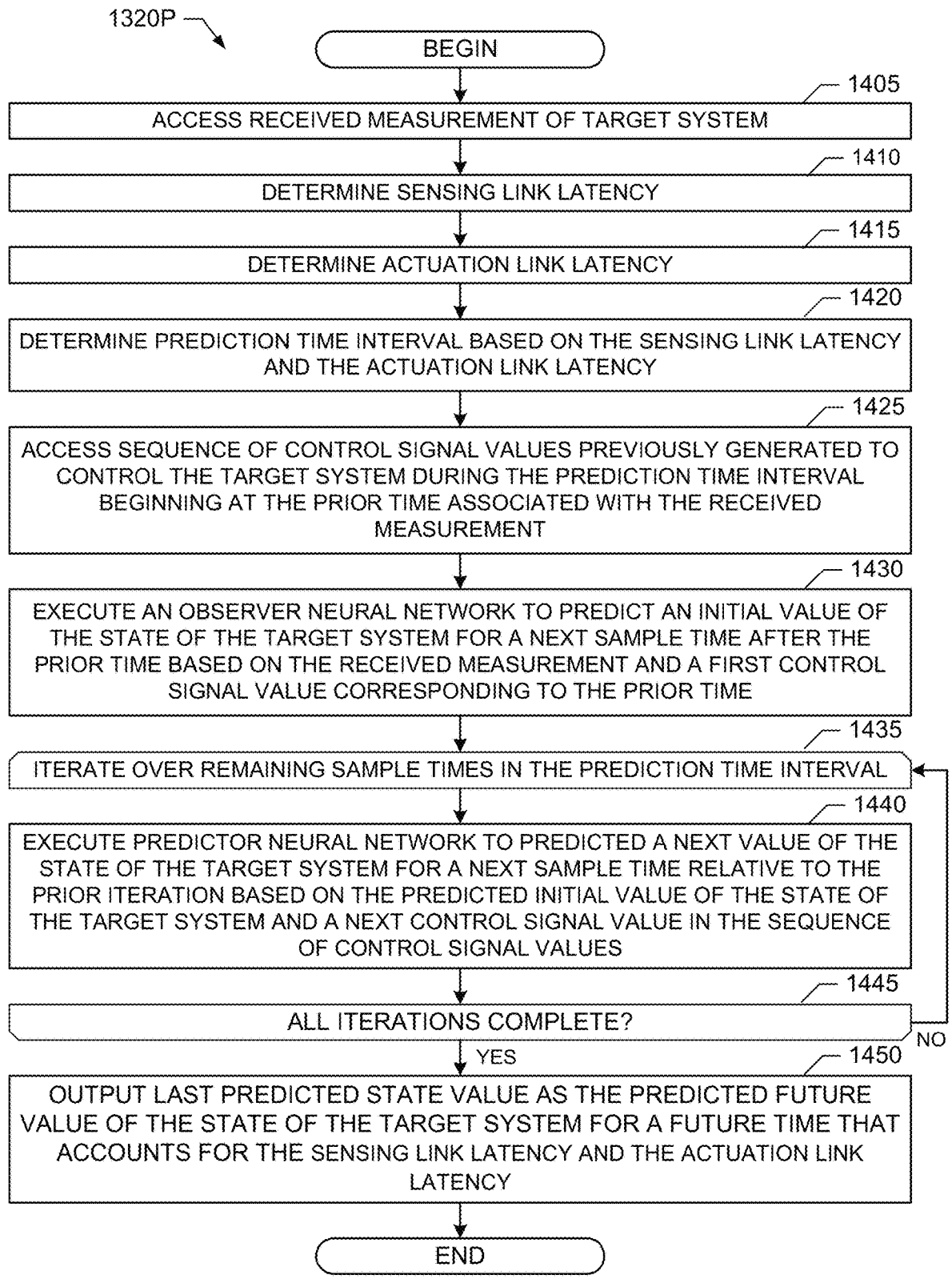
FIG. 14 is a flowchart representative of example computer readable instructions that may be executed to implement the example state prediction neural network of FIGS. 2, 7 and/or 8.
Figure 15:
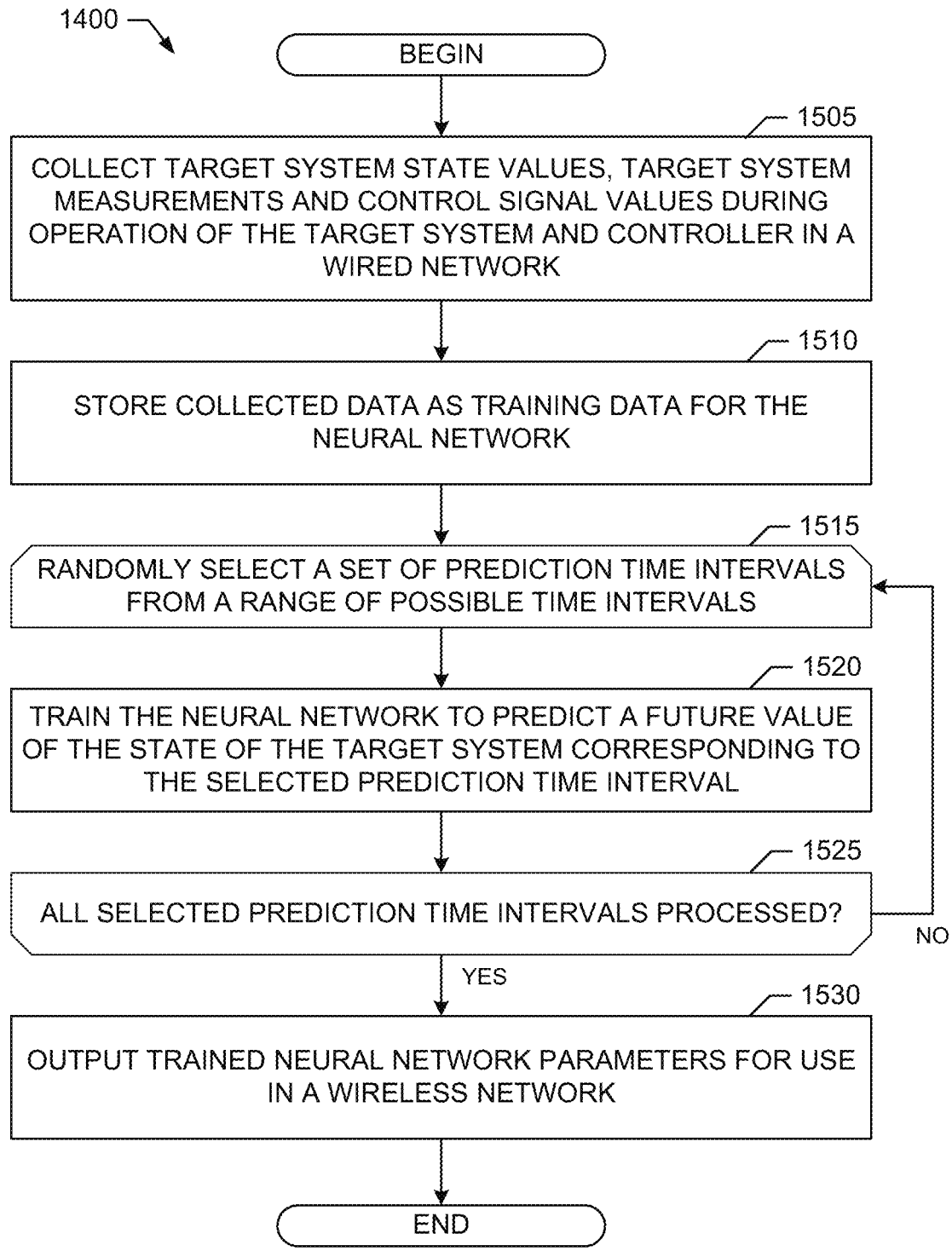
FIG. 15 is a flowchart representative of example computer readable instructions that may be executed to train the example state prediction neural network of FIGS. 2, 7 and/or 8.

Flowcharts representative of example hardware logic, machine readable instructions, hardware implemented state machines, and/or any combination thereof for implementing the predictive wireless feedback control system 200 are shown in FIGS. 13-15, respectively. In these examples, the machine readable instructions may be one or more executable programs or portion(s) of an executable program for execution by a computer processor, such as the processors 1612 and/or 1712 shown in the example processor platform 1600 and/or 1700 discussed below in connection with FIGS. 16 and/or 17. The one or more programs, or portion(s) thereof, may be embodied in software stored on a non-transitory computer readable storage medium such as a CD-ROM, a floppy disk, a hard drive, a DVD, a Blu-ray disk™, or a memory associated with the processors 1612 and/or 1712, but the entire program or programs and/or parts thereof could alternatively be executed by a device other than the processors 1612 and/or 1712, and/or embodied in firmware or dedicated hardware. Further, although the example program(s) is(are) described with reference to the flowcharts illustrated in FIGS. 13-15, many other methods of implementing the example predictive wireless feedback control system 200 may alternatively be used. For example, with reference to the flowcharts illustrated in FIGS. 13-15, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 13-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

An example program 1300 that may be executed to implement the example predictive wireless feedback control system 200 of FIGS. 2-8 is represented by the flowchart shown in FIG. 13. The example program 1300 implements both example control-side processing 1305 associated with the control side 210 of the predictive wireless feedback control system 200, and example target-side processing 1310 associated with the target side 205 of the predictive wireless feedback control system 200. With reference to the preceding figures and associated written descriptions, the example program 1300 begins execution at block 1315 at which the example state prediction neural network 240 obtains measurements of the target system 215 (e.g., as sensed by the example sensor(s) 225) via the WSL 262 (e.g., received by the example control-side receiver 250 from the example target-side transmitter 256), as described above. At block 1320, the state prediction neural network 240 processes the received measurements and control signal values output from the example controller 235 to predict, as described above, a future values of the state of the target system 215. As described above, the future state values are predicted ahead in time from the received measurements a prediction time interval corresponding to (e.g., the summation of) the sensing link latency $\tau_s$.associated with the WSL 262, and the actuation link latency $\tau_{a,MAX}$ associated with the WAL 264. An example program for implementing the processing at block 1320 is described below in connection with FIG. 14.

At block 1330, the controller 235 determines control signal values based on the predicted future state of the target system 215 obtained at block 1125 and a desired reference state of the target system 215, as described above. At block 1335, the controller 235 transmits the control signal values via the WSL 262 (e.g., transmitted by the example control-side transmitter 252 to the example target-side receiver 254) to the actuator 220, as described above. At block 1340, the actuator 220 receives the control signal values and, at block 1345, the actuator 220 operates on the control signal values at the appropriate time, as described above. At block 1350, the sensor(s) 225 determine new measurements of the target system 215 and transmit the measurement via the WSL 262 to the control side 210 of the wireless feedback control system 200, as described above, thereby completing the wireless feedback control loop until processing is no longer to continue (block 1350).

An example program 1320P that may be executed to implement the processing at block 1320 of FIG. 13, and/or the example state prediction neural network 240 of FIGS. 2,-4, 6, 7 and/or 8, is represented by the flowchart shown in FIG. 14. With reference to the preceding figures and associated written descriptions, the example program 1220P begins execution at block 1405 at which the state prediction neural network 240 accesses a received measurement of the target system 215 (e.g., received via the WSL 264), as described above. At block 1410, the sensing link latency determiner 284 determines the sensing link latency, $\tau_s$, of the WSL 262m as described above. At block 1415, the actuation link delay selector 290 determines the actuation link latency, $\tau_a$, of the WAL 264 (e.g., as reported by the actuation link latency reporter 296). At block 1420, the state prediction neural network 240 determines the prediction time interval based on (e.g., as a summation of) the sensing link latency, $\tau_s$, obtained at block 1410 and the actuation link latency, $\tau_a$, obtained at block 1415, as described above.

At block 1425, the state prediction neural network 240 accesses, as described above, a sequence of control signal values previously generated by the controller 235 to control the target system 215 during the prediction time interval beginning at the prior time associated with the received measurement accessed at block 1405. At block 1430, the observer neural network 805 of the state prediction neural network 240 executes to predict an initial value of the state of the target system 215 based on the received measurement and a first control signal value corresponding to the prior time of the received measurement, as described above. At block 1435, the predictor neural network 810 of the state prediction neural network 240 executes to iterate over the remaining sample times in the prediction time interval. For example, for each iteration, at block 1440, the predictor neural network 810 is executed to predict a next value of the state of the target system 215 for a next sample time relative to the prior iteration. As described above, the predictor neural network 810 predicts the next value of the target system state based on the predicted initial value of the target system 215 obtained at block 1430, and a next control signal value in the sequence of control signal values obtained at block 1425. When the processing iterations complete (block 1445), control proceeds to block 1450 at which the predictor neural network 810 outputs the last predicted value of the target system state as the predicted future value of the state of the target system 215 for a future time that accounts for the sensing link latency, $\tau_s$, and the actuation link latency, $\tau_a$, as described above.

An example program 1500 that may be executed to train the example state prediction neural network 240 of FIGS. 2,-4, 6, 7 and/or 8 is represented by the flowchart shown in FIG. 15. With reference to the preceding figures and associated written descriptions, the example program 1500 begins execution at block 1505 at which the example data collection system 500 is used to collect target system state values, target system measurements and control signal values during operation of the target system 1505 and the controller 235 in a wired network. At block 1510, the collected data is stored as training data for the state prediction neural network 240.

At block 1515, the example training procedure 600 is performed repeatedly for different possible values of the prediction time interval $\tau$ (e.g., selected randomly, sequentially, etc., from a range of possible intervals), as described above. For example, at block 1520, the training procedure 600 is performed, as described above, to train the neural network 240 to predict a future value of the state of the target system 215 corresponding to a selected prediction time interval $\tau$. Once training is completed for all selected values of the prediction time interval $\tau$ (block 1525), the training procedure 600 outputs the trained neural network parameters for use by the neural network in the wireless feedback control system 200.

Figure 16:
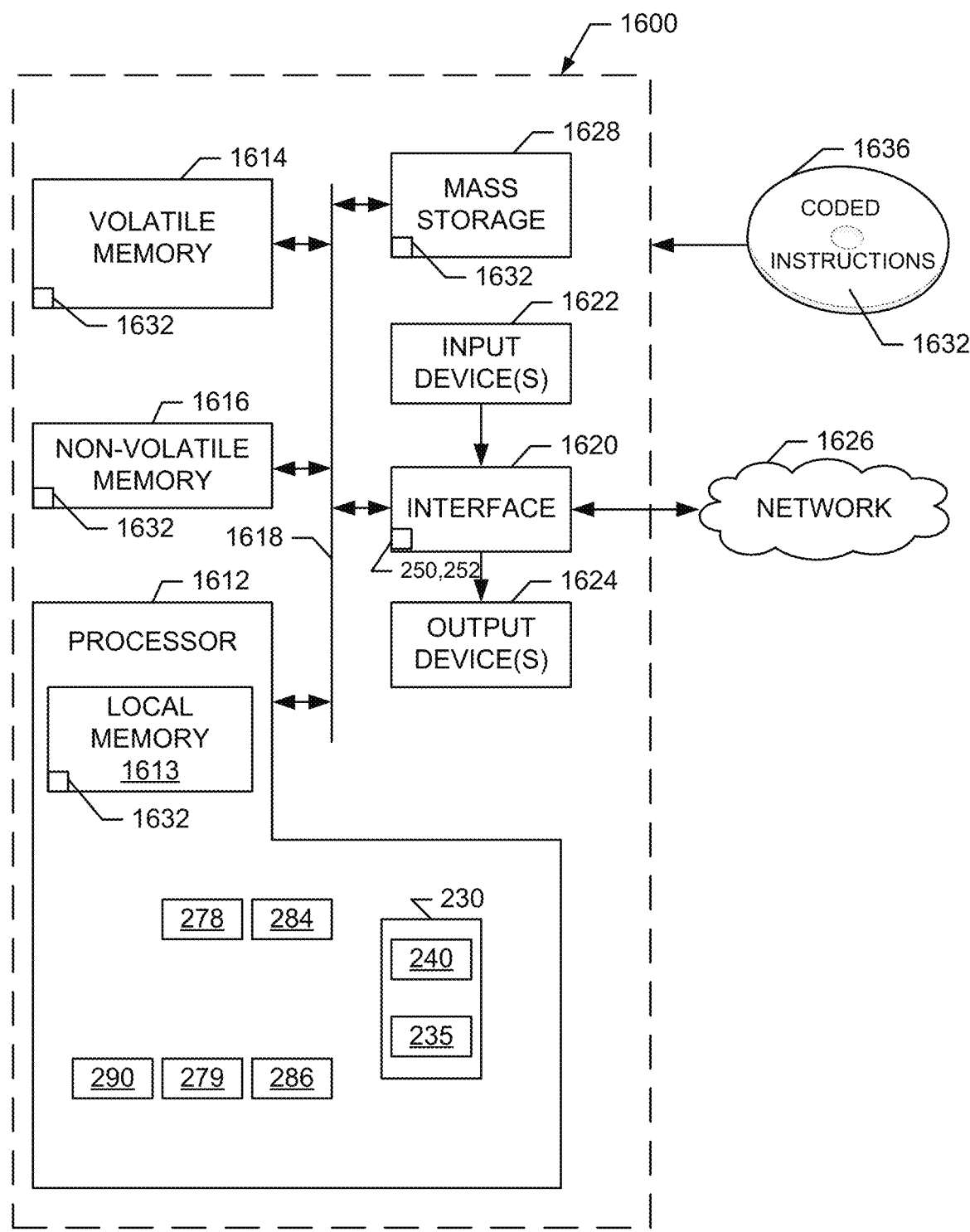
FIG. 16 is a block diagram of an example processor platform structured to execute the example computer readable instructions of FIGS. 11, 12 and/or 13 to implement control-side processing in the example predictive wireless feedback control system of FIG. 2.

FIG. 16 is a block diagram of an example processor platform 1600 structured to execute the instructions of FIGS. 11, 12 and/or 13 to implement control side processing in the example predictive wireless feedback control system 200 of FIGS. 2-5. The processor platform 1600 can be, for example, a server, a personal computer, a workstation, a self-learning machine (e.g., a neural network), a mobile device (e.g., a cell phone, a smart phone, a tablet such as an iPad™), or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor 1612 may be a semiconductor based (e.g., silicon based) device. In this example, the processor 1612 implements the example predictive feedback control solution 230, the example controller 235, the example state prediction neural network 240, the example control-side receiver 250, the example control-side transmitter 252, the example MAC synchronizers 278 and 279, the example sensing link latency determiner 284, the example transmit timestamper 286 and the example actuation link delay selector 290.

The processor 1612 of the illustrated example includes a local memory 1613 (e.g., a cache). The processor 1612 of the illustrated example is in communication with a main memory including a volatile memory 1614 and a non-volatile memory 1616 via a link 1618. The link 1618 may be implemented by a bus, one or more point-to-point connections, etc., or a combination thereof. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1600, can allow the user to control the computer system and provide data to the computer using physical gestures, such as, but not limited to, hand or body movements, facial expressions, and face recognition.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626, such as the WTSN 260. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1620 implements the example control-side receiver 250 and the example control-side transmitter 252.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 corresponding to the instructions of FIGS. 11, 12 and/or 13 may be stored in the mass storage device 1628, in the volatile memory 1614, in the non-volatile memory 1616, in the local memory 1613 and/or on a removable non-transitory computer readable storage medium, such as a CD or DVD 1636.

Figure 17:
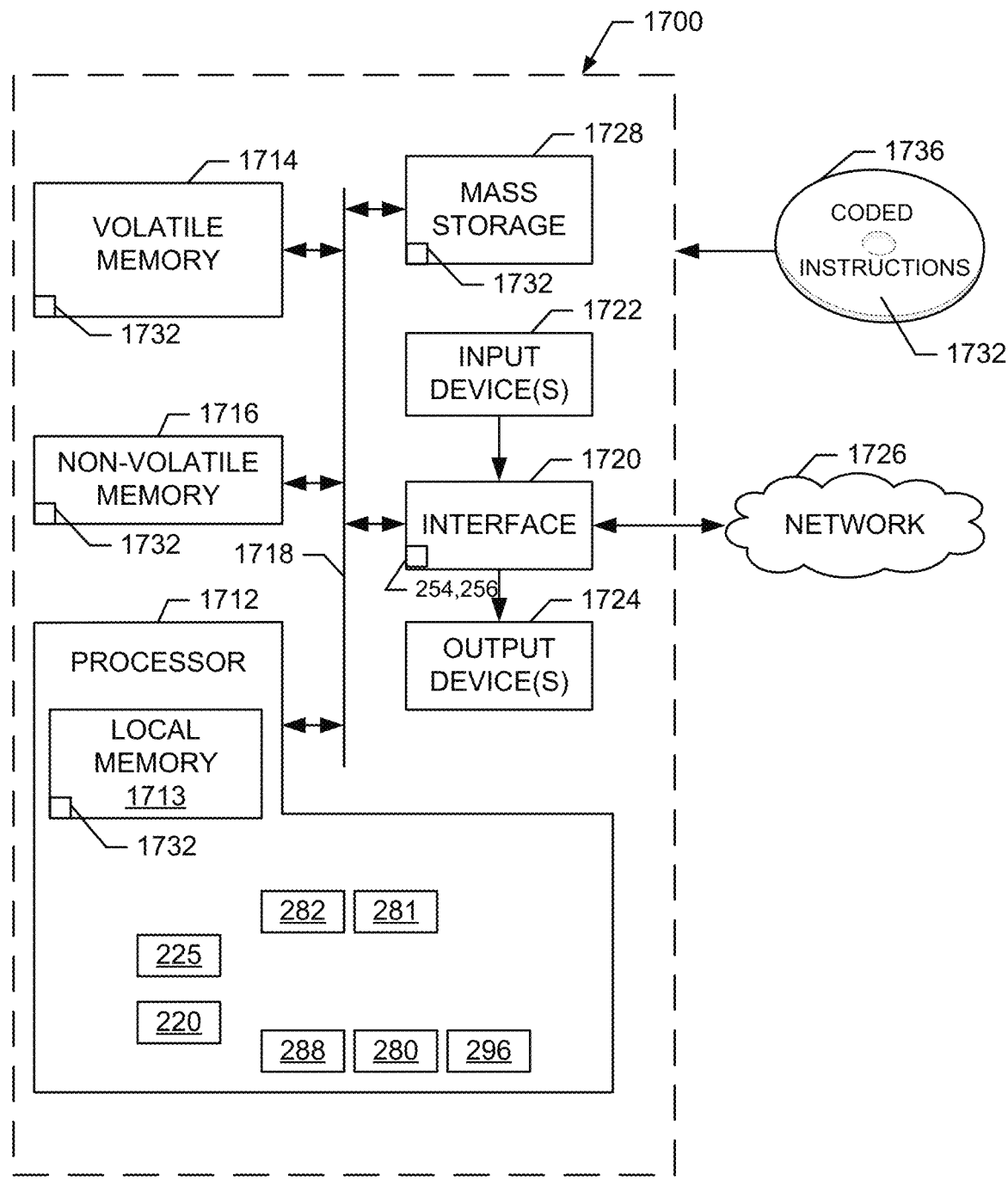
FIG. 17 is a block diagram of an example processor platform structured to execute the example computer readable instructions of FIG. 11 to implement target-side processing in the example predictive wireless feedback control system of FIG. 2.

FIG. 17 is a block diagram of an example processor platform 1700 structured to execute the instructions of FIG. 11 to implement target side processing in the example predictive wireless feedback control system 200 of FIGS. 2-3. The processor platform 1700 can be, for example, a server, a personal computer, a workstation, a self-learning machine (e.g., a neural network), a mobile device (e.g., a cell phone, a smart phone, a tablet such as an iPad™), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor 1712 may be a semiconductor based (e.g., silicon based) device. In this example, the processor 1712 implements the example actuator 220, the example sensors 225, the example MAC synchronizers 280 and 281, the example transmit timestamper 282, the example actuation link latency determiner 288 and the actuation link latency reporter 296.

The processor 1712 of the illustrated example includes a local memory 1713 (e.g., a cache). The processor 1712 of the illustrated example is in communication with a main memory including a volatile memory 1714 and a non-volatile memory 1716 via a link 1718. The link 1718 may be implemented by a bus, one or more point-to-point connections, etc., or a combination thereof. The volatile memory 1714 may be implemented by SDRAM, DRAM, RDRAM® and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a USB, a Bluetooth® interface, an NFC interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1700, can allow the user to control the computer system and provide data to the computer using physical gestures, such as, but not limited to, hand or body movements, facial expressions, and face recognition.

One or more output devices 1724 are also connected to the interface circuit 1720 of the illustrated example. The output devices 1724 can be implemented, for example, by display devices (e.g., an LED, an OLED, an LCD, a CRT display, an IPS display, a touchscreen, etc.), a tactile output device, a printer and/or speakers(s). The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726, such as the WTSN 260. The communication can be via, for example, an Ethernet connection, a DSL connection, a telephone line connection, a coaxial cable system, a satellite system, a line-of-site wireless system, a cellular telephone system, etc. In this example, the interface circuit 1720 implements the example target-side receiver 254 and the example target-side transmitter 256.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and DVD drives.

The machine executable instructions 1732 corresponding to the instructions of FIG. 11 may be stored in the mass storage device 1728, in the volatile memory 1714, in the non-volatile memory 1716, in the local memory 1713 and/or on a removable non-transitory computer readable storage medium, such as a CD or DVD 1736.

From the foregoing, it will be appreciated that example methods, apparatus, systems and articles of manufacture (e.g., physical storage media) to implement wireless feedback control loops with neural networks to predict target system states have been disclosed. Disclosed examples improve the efficiency of using a computing device by enabling use of wireless networks to perform feedback control of target systems that are latency-sensitive and/or reliability-sensitive. Disclosed examples are accordingly directed to one or more improvement(s) in the functioning of a computer.

The foregoing disclosure provides example solutions to implement wireless feedback control loops with neural networks to predict target system states. The following further examples, which include subject matter such as a wireless feedback control system, a non-transitory computer readable medium including instructions that, when executed, cause at least one processor to implement a wireless feedback control system, and a wireless feedback control method, are disclosed herein. The disclosed examples can be implemented individually and/or in one or more combinations.

Example 1 is a wireless feedback control system including a receiver to receive a first measurement of a target system via a first wireless link. The wireless feedback control system of example 1 also includes a neural network to predict a value of a state of the target system at a future time relative to a prior time associated with the first measurement, a time interval between the prior time and the future time based on a first latency of the first wireless link and a second latency associated with a second wireless link. In example 1, the neural network is to predict the value of the state of the target system based on the first measurement and a prior sequence of values of a control signal previously generated to control the target system during the time interval between the prior time and the future time. In example 1, the neural network is to output the predicted value of the state of the target system to a controller to generate a new value of the control signal. The wireless feedback control system of example 1 further includes a transmitter to transmit the new value of the control signal to the target system via the second wireless link.

Example 2 includes the subject matter of example 1, wherein the receiver is a first receiver, the transmitter is a first transmitter, and the first wireless link and the second wireless link are implemented by a wireless time sensitive network that is to provide time synchronization between (i) the first receiver and a second transmitter that is to transmit the first measurement of the target system to the first receiver via the first wireless link, and (ii) the first transmitter and a second receiver that is to receive the new value of the control signal transmitted by the first transmitter via the second wireless link.

Example 3 includes the subject matter of example 2, wherein the first receiver is to receive the first measurement in a message from the second transmitter via the first wireless link, the message to include a timestamp to identify a first time at which the second transmitter transmitted the message, the first receiver to determine the first latency of the first wireless link based on the timestamp and a second time at which the first receiver received the message.

Example 4 includes the subject matter of example 2, wherein the first transmitter is to transmit a first one of the prior sequence of values of the control signal in a message to the second receiver via the second wireless link, the message to include a timestamp to identify a first time at which the first transmitter transmitted the message, the first transmitter to determine the second latency associated with the second wireless link based on a report from the second receiver in response to the message.

Example 5 includes the subject matter of example 4, wherein the second latency associated with the first wireless link corresponds to at least one of a maximum latency of the second wireless link, a minimum latency of the second wireless link, an average latency for the second wireless link, or a probabilistic latency value for the second wireless link.

Example 6 includes the subject matter of any one of examples 1 to 5, wherein the time interval between the prior time and the future time is sampled to include a first number of sample times, the predicted value of the state of the target system is a first predicted value, and the neural network includes a first neural network in communication with a second neural network, the first neural network trained to predict a second predicted value of the state of the target system based on the first measurement and a first one of the prior sequence of values of the control signal corresponding to a first sample time representative of the prior time, the second predicted value of the state of the target system corresponding to one sample time after the first sample time, and the second neural network to predict the first predicted value of the state of the target system based on the second predicted value of the state of the target system and remaining ones of the prior sequence of values of the control signal corresponding to ones of the first number of samples times after the first sample time.

Example 7 includes the subject matter of example 6, wherein the second neural network is to predict a plurality of predicted values of the state of the target system corresponding respectively to respective sample times between the second predicted value and the first predicted value, the second neural network to predict respective ones of the plurality of predicted values iteratively based on application of the remaining ones of the sequence of values of the control signal sequentially to the second neural network.

Example 8 includes the subject matter of any one of examples 1 to 7, and further includes a neural network updater to update the neural network based on an error between the first measurement and a delayed reference value representative of a target state of the target system corresponding to the prior time associated with the first measurement.

Example 9 is a non-transitory computer readable medium including computer readable instructions which, when executed, cause at least one processor to at least: (i) execute a neural network to predict a value of a state of a target system at a future time relative to a prior time associated with a first measurement of the target system obtained via a first wireless link, a time interval between the prior time and the future time based on a first latency of the first wireless link and a second latency associated with a second wireless link, the neural network to predict the value of the state of the target system based on the first measurement and a prior sequence of values of a control signal previously generated to control the target system during the time interval between the prior time and the future time; and (ii) output the predicted value of the state of the target system to a controller that is to generate a new value of the control signal that is to be sent to the target system via the second wireless link.

Example 10 includes the subject matter of example 9, wherein the time interval between the prior time and the future time is sampled to include a first number of sample times, the predicted value of the state of the target system is a first predicted value, and to execute the neural network, the computer readable instructions, when executed, cause the at least one processor to: (i) execute a first neural network to predict a second predicted value of the state of the target system based on the first measurement and a first one of the prior sequence of values of the control signal corresponding to a first sample time representative of the prior time, the second predicted value of the state of the target system corresponding to one sample time after the first sample time; and (ii) execute a second neural network to predict the first predicted value of the state of the target system based on the second predicted value of the state of the target system and remaining ones of the sequence of values of the control signal corresponding to ones of the first number of samples times after the first sample time.

Example 11 includes the subject matter of example 10, wherein the computer readable instructions, when executed, cause the at least one processor to execute the second neural network to predict a plurality of predicted values of the state of the target system corresponding respectively to respective sample times between the second predicted value and the first predicted value, the instructions, when executed, to cause the at least one processor to execute the second neural network to predict respective ones of the plurality of predicted values iteratively based on application of the remaining ones of the sequence of values of the control signal sequentially to the second neural network.

Example 12 includes the subject matter of any one of examples 9 to 11, wherein the computer readable instructions, when executed, further cause the at least one processor to update the neural network based on an error between the first measurement and a delayed reference value representative of a target state of the target system corresponding to the prior time associated with the first measurement.

Example 13 is a wireless feedback control method including accessing a first measurement of a target system received via a first wireless link. Example 13 also includes predicting, with a neural network, a value of a state of the target system at a future time relative to a prior time associated with the first measurement, a time interval between the prior time and the future time based on a first latency of the first wireless link and a second latency associated with a second wireless link, the predicting of the value of the state of the target system based on the first measurement and a prior sequence of values of a control signal previously generated to control the target system during the time interval between the prior time and the future time. Example 13 further includes outputting the predicted value of the state of the target system to a controller that is to generate a new value of the control signal, and sending the new value of the control signal to the target system via the second wireless link.

Example 14 includes the subject matter of example 13, wherein the first wireless link and the second wireless link are implemented by a wireless time sensitive network.

Example 15 includes the subject matter of example 13 or example 14, and further includes (i) receiving the first measurement in a message via the first wireless link, the message to include a timestamp to identify a first time at which the message was transmitted; and (ii) determining the first latency of the first wireless link based on the timestamp and a second time at which the message was received.

Example 16 includes the subject matter of any one of examples 13 to 15, and further includes (i) transmitting a first one of the prior sequence of values of the control signal in a message via the second wireless link, the message to include a timestamp to identify a first time at which the message was transmitted; and (ii) determining the second latency associated with the second wireless link based on a report received in response to the message.

Example 17 includes the subject matter of example 16, wherein the second latency associated with the first wireless link corresponds to at least one of a maximum latency of the second wireless link, a minimum latency of the second wireless link, an average latency for the second wireless link, or a probabilistic latency value for the second wireless link.

Example 18 includes the subject matter of any one of examples 13 to 17, wherein the time interval between the prior time and the future time is sampled to include a first number of sample times, the predicted value of the state of the target system is a first predicted value, the neural network includes a first neural network in communication with a second neural network, and the predicting the value of the state of the target system includes: (i) predicting, with the first neural network, a second predicted value of the state of the target system based on the first measurement and a first one of the prior sequence of values of the control signal corresponding to a first sample time representative of the prior time, the second predicted value of the state of the target system corresponding to one sample time after the first sample time; and (ii) predicting, with the second neural network, the first predicted value of the state of the target system based on the second predicted value of the state of the target system and remaining ones of the sequence of values of the control signal corresponding to ones of the first number of samples times after the first sample time.

Example 19 includes the subject matter of example 18, wherein the predicting with the second neural network includes predicting, with the second neural network, a plurality of predicted values of the state of the target system corresponding respectively to respective sample times between the second predicted value and the first predicted value, the second neural network to predict respective ones of the plurality of predicted values iteratively based on application of the remaining ones of the sequence of values of the control signal sequentially to the second neural network.

Example 20 includes the subject matter of any one of examples 13 to 19, and further includes updating the neural network based on an error between the first measurement and a delayed reference value representative of a target state of the target system corresponding to the prior time associated with the first measurement.

Example 21 is a wireless feedback control system including means for receiving a first measurement of a target system via a first wireless link. The wireless feedback control system of example 21 also includes means for predicting a value of a state of the target system at a future time relative to a prior time associated with the first measurement, a time interval between the prior time and the future time based on a first latency of the first wireless link and a second latency associated with a second wireless link, the means for predicting to predict the value of the state of the target system based on the first measurement and a prior sequence of values of a control signal previously generated to control the target system during the time interval between the prior time and the future time, the means for predicting to output the predicted value of the state of the target system to a controller to generate a new value of the control signal. The wireless feedback control system of example 21 further includes means for transmitting the new value of the control signal to the target system via the second wireless link.

Example 22 includes the subject matter of example 21, wherein the time interval between the prior time and the future time is sampled to include a first number of sample times, and the predicted value of the state of the target system is a first predicted value. The means for predicting of example 22 includes first neural network means for predicting a second predicted value of the state of the target system based on the first measurement and a first one of the prior sequence of values of the control signal corresponding to a first sample time representative of the prior time, the second predicted value of the state of the target system corresponding to one sample time after the first sample time. The means for predicting of example 22 also includes second neural network means for predicting the first predicted value of the state of the target system based on the second predicted value of the state of the target system and remaining ones of the sequence of values of the control signal corresponding to ones of the first number of samples times after the first sample time.

Example 23 includes the subject matter of example 22, wherein the second neural network means is to predict a plurality of predicted values of the state of the target system corresponding respectively to respective sample times between the second predicted value and the first predicted value, the second neural network means to predict respective ones of the plurality of predicted values iteratively based on application of the remaining ones of the sequence of values of the control signal sequentially to the second neural network.

Example 24 includes the subject matter of any one of examples 21 to 23, and further includes means for updating the means for predicting based on an error between the first measurement and a delayed reference value representative of a target state of the target system corresponding to the prior time associated with the first measurement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wireless feedback control system comprising:
   a receiver to receive a first measurement of a target system via a first wireless link;
   a first neural network and a second neural network to:
      predict a future value of a state of the target system corresponding to a future time relative to a prior time associated with the first measurement, a time interval between the prior time and the future time based on a first latency associated with the first wireless link and a second latency associated with a second wireless link, the first neural network to predict an initial value of the state of the target system based on the first measurement and a first one of a sequence of prior values of a control signal previously generated to control the target system during the time interval between the prior time and the future time, the second neural network to predict intermediate values and the future value of the state of the target system iteratively based on the initial value predicted by the first neural network and remaining ones of the sequence of prior values of the control signal, the second neural network to operate at a faster rate than the first neural network to cause the second neural network to perform a first number of predictor prediction iterations during a time interval in which the first neural network is to perform a single observer prediction iteration, the first number of predictor prediction iterations based on a sum of the first latency and the second latency; and
      output the predicted future value of the state of the target system to a controller to generate a new value of the control signal; and
   a transmitter to transmit the new value of the control signal to the target system via the second wireless link.

2. The wireless feedback control system of claim 1, wherein the receiver is a first receiver, the transmitter is a first transmitter, and the first wireless link and the second wireless link are implemented by a wireless time sensitive network that is to provide time synchronization between (i) the first receiver and a second transmitter that is to transmit the first measurement of the target system to the first receiver via the first wireless link, and (ii) the first transmitter and a second receiver that is to receive the new value of the control signal transmitted by the first transmitter via the second wireless link.

3. The wireless feedback control system of claim 2, wherein the first receiver is to receive the first measurement in a message from the second transmitter via the first wireless link, the message to include a timestamp to identify a first time at which the second transmitter transmitted the message, the first receiver to determine the first latency associated with the first wireless link based on the timestamp and a second time at which the first receiver received the message.

4. The wireless feedback control system of claim 2, wherein the first transmitter is to transmit the first one of the sequence of prior values of the control signal in a message to the second receiver via the second wireless link, the message to include a timestamp to identify a first time at which the first transmitter transmitted the message, the first transmitter to determine the second latency associated with the second wireless link based on a report from the second receiver in response to the message.

5. The wireless feedback control system of claim 4, wherein the second latency associated with the second wireless link corresponds to at least one of a maximum latency of the second wireless link, a minimum latency of the second wireless link, an average latency for the second wireless link, or a probabilistic latency value for the second wireless link.

6. The wireless feedback control system of claim 1, wherein the time interval between the prior time and the future time is sampled to include a first number of sample times, the first one of the sequence of prior values of the control signal corresponds to a first sample time representative of the prior time, the predicted initial value of the state of the target system corresponds to one sample time after the first sample time, and the remaining ones of the sequence of prior values of the control signal correspond to ones of the first number of samples times after the first sample time.

7. The wireless feedback control system of claim 6, wherein the second neural network is to predict the intermediate values of the state of the target system to correspond respectively to respective sample times between the predicted initial value and the predicted future value, the second neural network to predict respective ones of the intermediate values and the future value iteratively based on application of the remaining ones of the sequence of prior values of the control signal sequentially to the second neural network.

8. The wireless feedback control system of claim 1, further including a neural network updater to update at least one of the first neural network or the second neural network based on an error between the first measurement and a delayed reference value representative of a target state of the target system corresponding to the prior time associated with the first measurement.

9. At least one non-transitory computer readable medium comprising computer readable instructions which, when executed, cause at least one processor to at least:
execute a first neural network and a second neural network to predict a future value of a state of a target system corresponding to a future time relative to a prior time associated with a first measurement of the target system obtained via a first wireless link, a time interval between the prior time and the future time based on a first latency associated with the first wireless link and a second latency associated with a second wireless link, the first neural network to predict an initial value of the state of the target system based on the first measurement and a first one of a sequence of prior values of a control signal previously generated to control the target system during the time interval between the prior time and the future time, the second neural network to predict intermediate values and the future value of the state of the target system iteratively based on the initial value predicted by the first neural network and remaining ones of the sequence of prior values of the control signal, the second neural network to operate at a faster rate than the first neural network to cause the second neural network to perform a first number of predictor prediction iterations during a time interval in which the first neural network is to perform a single observer prediction iteration, the first number of predictor prediction iterations based on a sum of the first latency and the second latency; and
output the predicted future value of the state of the target system to a controller that is to generate a new value of the control signal that is to be sent to the target system via the second wireless link.

10. The at least one non-transitory computer readable medium of claim 9, wherein the time interval between the prior time and the future time is sampled to include a first number of sample times, the first one of the sequence of prior values of the control signal corresponds to a first sample time representative of the prior time, the predicted initial value of the state of the target system corresponds to one sample time after the first sample time, and the remaining ones of the sequence of prior values of the control signal correspond to ones of the first number of samples times after the first sample time.

11. The at least one non-transitory computer readable medium of claim 10, wherein the computer readable instructions are to cause the at least one processor to execute the second neural network to predict the intermediate values of the state of the target system to correspond respectively to respective sample times between the predicted initial value and the predicted future value, the second neural network to predict respective ones of the intermediate values and the future value iteratively based on application of the remaining ones of the sequence of prior values of the control signal sequentially to the second neural network.

12. The at least one non-transitory computer readable medium of claim 9, wherein the computer readable instructions are to cause the at least one processor to update at least one of the first neural network or the second neural network based on an error between the first measurement and a delayed reference value representative of a target state of the target system corresponding to the prior time associated with the first measurement.

13. A wireless feedback control method comprising:
accessing a first measurement of a target system received via a first wireless link;
predicting, with a first neural network and a second neural network, a future value of a state of the target system corresponding to a future time relative to a prior time associated with the first measurement, a time interval between the prior time and the future time based on a first latency associated with the first wireless link and a second latency associated with a second wireless link, the predicting of the future value of the state of the target system including (i) predicting, with the first neural network, an initial value of the state of the target system based on the first measurement and a first one of a sequence of prior values of a control signal previously generated to control the target system during the time interval between the prior time and the future time, and (ii) predicting, with the second neural network, intermediate values and the future value of the state of the target system iteratively based on the initial value predicted by the first neural network and remaining ones of the sequence of prior values of the control signal, the second neural network to operate at a faster rate than the first neural network to cause the second neural network to perform a first number of predictor prediction iterations during a time interval in which the first neural network is to perform a single observer prediction iteration, the first number of predictor prediction iterations based on a sum of the first latency and the second latency;
outputting the predicted future value of the state of the target system to a controller that is to generate a new value of the control signal; and
sending the new value of the control signal to the target system via the second wireless link.

14. The method of claim 13, wherein the first wireless link and the second wireless link are implemented by a wireless time sensitive network.

15. The method of claim 13, further including:
receiving the first measurement in a message via the first wireless link, the message to include a timestamp to identify a first time at which the message was transmitted; and
determining the first latency associated with the first wireless link based on the timestamp and a second time at which the message was received.

16. The method of claim 13, further including:
transmitting the first one of the sequence of prior values of the control signal in a message via the second wireless link, the message to include a timestamp to identify a first time at which the message was transmitted; and
determining the second latency associated with the second wireless link based on a report received in response to the message.

17. The method of claim 16, wherein the second latency associated with the second wireless link corresponds to at least one of a maximum latency of the second wireless link, a minimum latency of the second wireless link, an average latency for the second wireless link, or a probabilistic latency value for the second wireless link.

18. The method of claim 13, wherein the time interval between the prior time and the future time is sampled to include a first number of sample times, the first one of the sequence of prior values of the control signal corresponds to a first sample time representative of the prior time, the predicted initial value of the state of the target system corresponds to one sample time after the first sample time, and the remaining ones of the sequence of prior values of the control signal correspond to ones of the first number of samples times after the first sample time.

19. The method of claim 18, wherein the predicting with the second neural network includes predicting, with the second neural network, the intermediate values of the state of the target system to correspond respectively to respective sample times between the predicted initial value and the predicted future value, the second neural network to predict respective ones of the intermediate values and the future value iteratively based on application of the remaining ones of the sequence of prior values of the control signal sequentially to the second neural network.

20. The method of claim 13, further including updating at least one of the first neural network or the second neural network based on an error between the first measurement and a delayed reference value representative of a target state of the target system corresponding to the prior time associated with the first measurement.

21. A wireless feedback control system comprising:
means for receiving a first measurement of a target system via a first wireless link;
means for predicting a future value of a state of the target system corresponding to a future time relative to a prior time associated with the first measurement, a time interval between the prior time and the future time based on a first latency associated with the first wireless link and a second latency associated with a second wireless link, the means for predicting including (i) first neural network means for predicting an initial value of the state of the target system based on the first measurement and a first one of a sequence of prior values of a control signal previously generated to control the target system during the time interval between the prior time and the future time, and (ii) second neural network means for predicting intermediate values and the future value of the state of the target system iteratively based on the initial value predicted by the first neural network means and remaining ones of the sequence of prior values of the control signal, the second neural network means to operate at a faster rate than the first neural network means to cause the second neural network means to perform a first number of predictor prediction iterations during a time interval in which the first neural network means is to perform a single observer prediction iteration, the first number of predictor prediction iterations based on a sum of the first latency and the second latency, the means for predicting to output the predicted future value of the state of the target system to a controller to generate a new value of the control signal; and
means for transmitting the new value of the control signal to the target system via the second wireless link.

22. The wireless feedback control system of claim 21, wherein the time interval between the prior time and the future time is sampled to include a first number of sample times, the first one of the sequence of prior values of the control signal corresponds to a first sample time representative of the prior time, the predicted initial value of the state of the target system corresponds to one sample time after the first sample time, the remaining ones of the sequence of prior values of the control signal correspond to ones of the first number of samples times after the first sample time.

23. The wireless feedback control system of claim 22, wherein the second neural network means is to predict the intermediate values of the state of the target system to correspond respectively to respective sample times between the predicted initial value and the predicted future value, the second neural network means to predict respective ones of the intermediate values and the future value iteratively based on application of the remaining ones of the sequence of prior values of the control signal sequentially to the second neural network means.

24. The wireless feedback control system of claim 21, further including means for updating the means for predicting based on an error between the first measurement and a delayed reference value representative of a target state of the target system corresponding to the prior time associated with the first measurement.

* * * * *